US012228879B2

(12) United States Patent
Sato

(10) Patent No.: US 12,228,879 B2

(45) Date of Patent: Feb. 18, 2025

(54) IMAGE FORMING APPARATUS

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/357,095

(22) Filed: Jul. 21, 2023

(65) Prior Publication Data

US 2023/0359143 A1 Nov. 9, 2023

Related U.S. Application Data

(63) Continuation of application No. 17/842,894, filed on Jun. 17, 2022, now Pat. No. 11,754,967, which is a (Continued)

(30) Foreign Application Priority Data

Aug. 28, 2020 (JP) ................................ 2020-144884
May 14, 2021 (JP) ................................ 2021-082140

(51) Int. Cl.
*G03G 21/18* (2006.01)

(52) U.S. Cl.
CPC ..... *G03G 21/1814* (2013.01); *G03G 21/1842* (2013.01)

(58) Field of Classification Search
CPC ........... G03G 21/1676; G03G 21/1814; G03G 21/1817; G03G 21/1839; G03G 21/1842; G03G 21/1846
See application file for complete search history.

(56) References Cited

U.S. PATENT DOCUMENTS

2006/0140673 A1 6/2006 Kamimura et al.
2009/0142092 A1 6/2009 Sato
(Continued)

FOREIGN PATENT DOCUMENTS

JP 2006-184552 A 7/2006
JP 2009-139495 A 6/2009
(Continued)

OTHER PUBLICATIONS

Japanese Office Action for the related Japanese Patent Application No. 2021-082140 dated Oct. 29, 2024.

*Primary Examiner* — Hoang X Ngo
(74) *Attorney, Agent, or Firm* — KENEALY VAIDYA LLP

(57) ABSTRACT

An image forming apparatus includes a housing having an opening, a drawer movable through the opening between a housing position and a drawn position, a process cartridge mountable to and removable from the drawer and including a drum cartridge including a photosensitive drum rotating about a first axis, and a developing cartridge including a developing roller that supplies toner to the photosensitive drum and rotates about a second axis extending in parallel with the first axis, and an intermediate transfer belt located above the drum cartridge in a state where the process cartridge is mounted to the drawer and the drawer is located in the housing position. The developing cartridge includes a handle. The handle is located opposite to the photosensitive drum with respect to the developing roller in a direction of drawing the drawer, in a state where the process cartridge is removed from the drawer.

12 Claims, 12 Drawing Sheets

Related U.S. Application Data continuation of application No. 17/412,237, filed on Aug. 25, 2021, now Pat. No. 11,385,592.

(56) References Cited

U.S. PATENT DOCUMENTS

| | | | | |
|---|---|---|---|---|
| 2009/0324283 | A1 | 12/2009 | Mushika et al. | |
| 2010/0074646 | A1* | 3/2010 | Miyahara | G03G 21/169<br>399/99 |
| 2011/0064463 | A1 | 3/2011 | Hashimoto et al. | |
| 2012/0207511 | A1 | 8/2012 | Sato | |
| 2014/0093273 | A1 | 4/2014 | Hayakawa | |
| 2015/0055974 | A1 | 2/2015 | Hoashi et al. | |
| 2015/0160607 | A1 | 6/2015 | Takagi et al. | |
| 2017/0176925 | A1* | 6/2017 | Sakakibara | G03G 21/1821 |
| 2017/0261925 | A1 | 9/2017 | Komatsu et al. | |

FOREIGN PATENT DOCUMENTS

| | | | |
|---|---|---|---|
| JP | 2011-59511 | A | 3/2011 |
| JP | 2012-168273 | A | 9/2012 |
| JP | 2014-16484 | A | 1/2014 |

* cited by examiner

IMAGE FORMING APPARATUS

REFERENCE TO RELATED APPLICATIONS

This application is a continuation of U.S. patent application Ser. No. 17/842,894, filed Jun. 17, 2022, which is a continuation application claiming priority benefit under 35 U.S.C. 120 of U.S. patent application Ser. No. 17/412,237 filed on Aug. 25, 2021, which is based upon and claims the benefit of priority under 35 U.S.C. 119 from Japanese Patent Application No. 2020-144884 filed on Aug. 28, 2020, and Japanese Patent Application No. 2021-082140 filed on May 14, 2021. The contents of the aforementioned applications are incorporated herein by reference in their entirety.

BACKGROUND ART

Technical Field

The present disclosure generally relates to an image forming apparatus.

Background

In the related art, an image forming apparatus includes a housing, a drawer, a process cartridge, and a transfer device. The process cartridge includes a photosensitive drum, and a developing roller. The drawer is movable between a housing position in which it is accommodated in the housing and a drawn position in which it is drawn from the housing. In a state where the process cartridge is mounted to the drawer and the drawer is located in the housing position, the transfer device is located above the process cartridge. In a state where the drawer is located in the drawn position, the process cartridge is mountable to and removable from the drawer.

In the image forming apparatus as described above, when it is necessary to replace the developing roller, the entire process cartridge including the photosensitive drum should be replaced even though it is not necessary to replace the photosensitive drum. As for the image forming apparatus, it is difficult to reduce the use cost.

DESCRIPTION

Summary

It is therefore an object of the present disclosure to provide an image forming apparatus in which a first developing cartridge and a first drum cartridge can be individually replaced.

Disclosed here is an image forming apparatus including: a housing having an opening; a drawer movable, through the opening, between a housing position in which the drawer is housed in the housing and a drawn position in which the drawer is drawn from the housing; a process cartridge mountable to and removable from the drawer, and including: a drum cartridge including a photosensitive drum that rotates about a first axis extending in a first direction; and a developing cartridge including a developing roller that supplies toner to the photosensitive drum and rotates about a second axis extending in parallel with the first axis; and an intermediate transfer belt located above the drum cartridge in a state where the process cartridge is mounted to the drawer and the drawer is located in the housing position, in which the developing cartridge includes a handle, the handle located opposite to the photosensitive drum with respect to the developing roller in a direction of drawing the drawer, in a state where the process cartridge is mounted to the drawer.

DETAILED DESCRIPTION

Image Forming Apparatus 1

An image forming apparatus 1 of a first embodiment will be described with reference to FIGS. 1 to 3.

Figure 1:
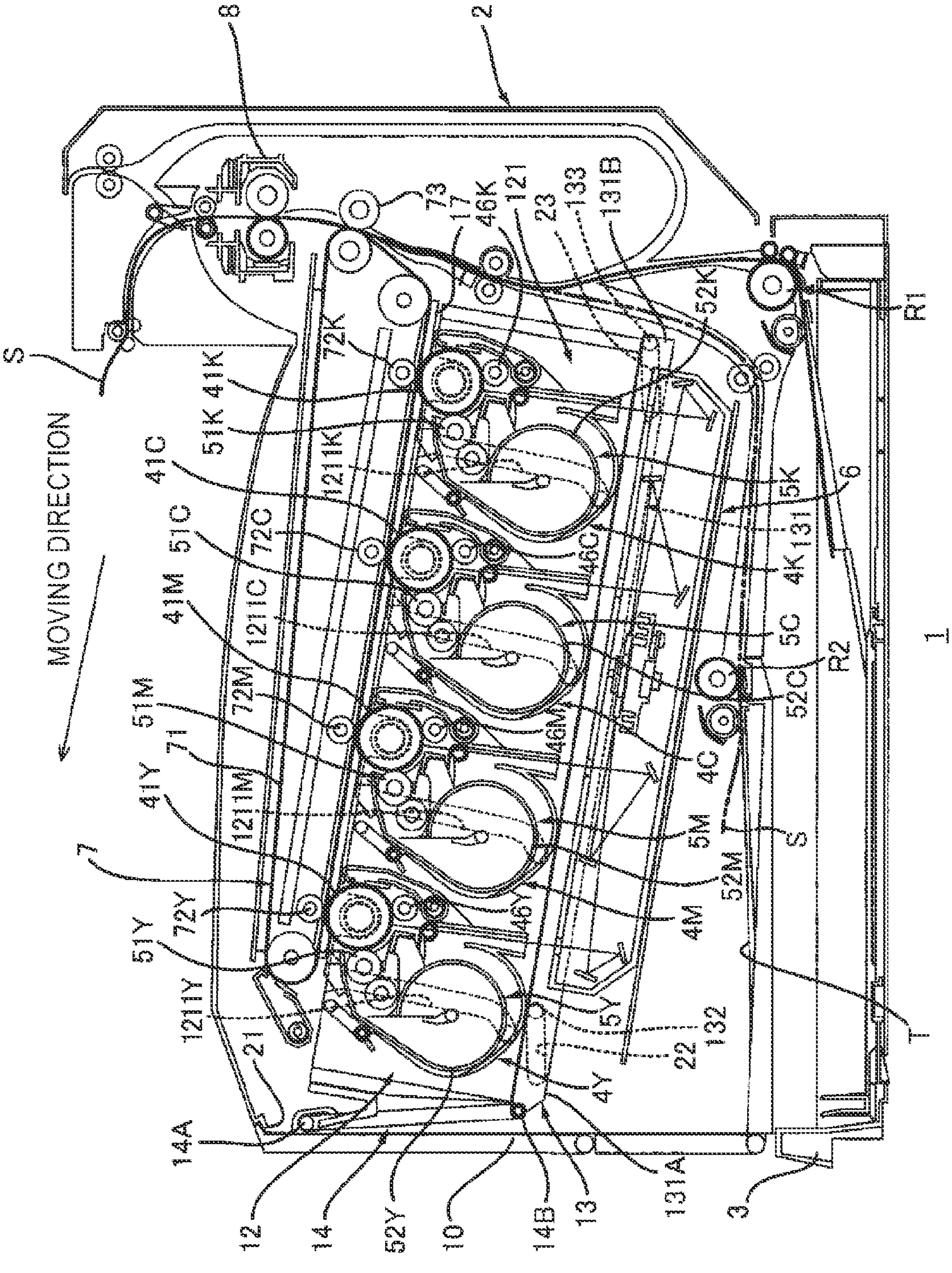
FIG. 1 is a schematic configuration view of an image forming apparatus, showing a state where a cover is located in a closed position and a drawer is located in a housing position.

As shown in FIG. 1, the image forming apparatus 1 includes a housing 2, a cover 10, a sheet cassette 3, a first feed roller R1, a manual tray T, a second feed roller R2, a drawer 12, four drum cartridges 4Y, 4M, 4C and 4K, four developing cartridges 5Y, 5M, 5C and 5K, an exposure device 6, a transfer device 7, and a fixing device 8.

1.1 Housing 2

The housing 2 houses the sheet cassette 3, the drawer 12, the four drum cartridges 4Y, 4M, 4C and 4K, the four developing cartridges 5Y, 5M, 5C and 5K, the exposure device 6, the transfer device 7, and the fixing device 8. The housing 2 has an opening 21 (refer to FIG. 2). The opening 21 is located in one outer surface of the housing 2 in a horizontal direction. The horizontal direction indicates a direction orthogonal to the gravity direction when the image forming apparatus 1 is put in a normal use state. The gravity direction in a state where the image forming apparatus 1 is put in the normal use state is referred to as an upper and lower direction.

1.2 Cover 10

Figure 2:
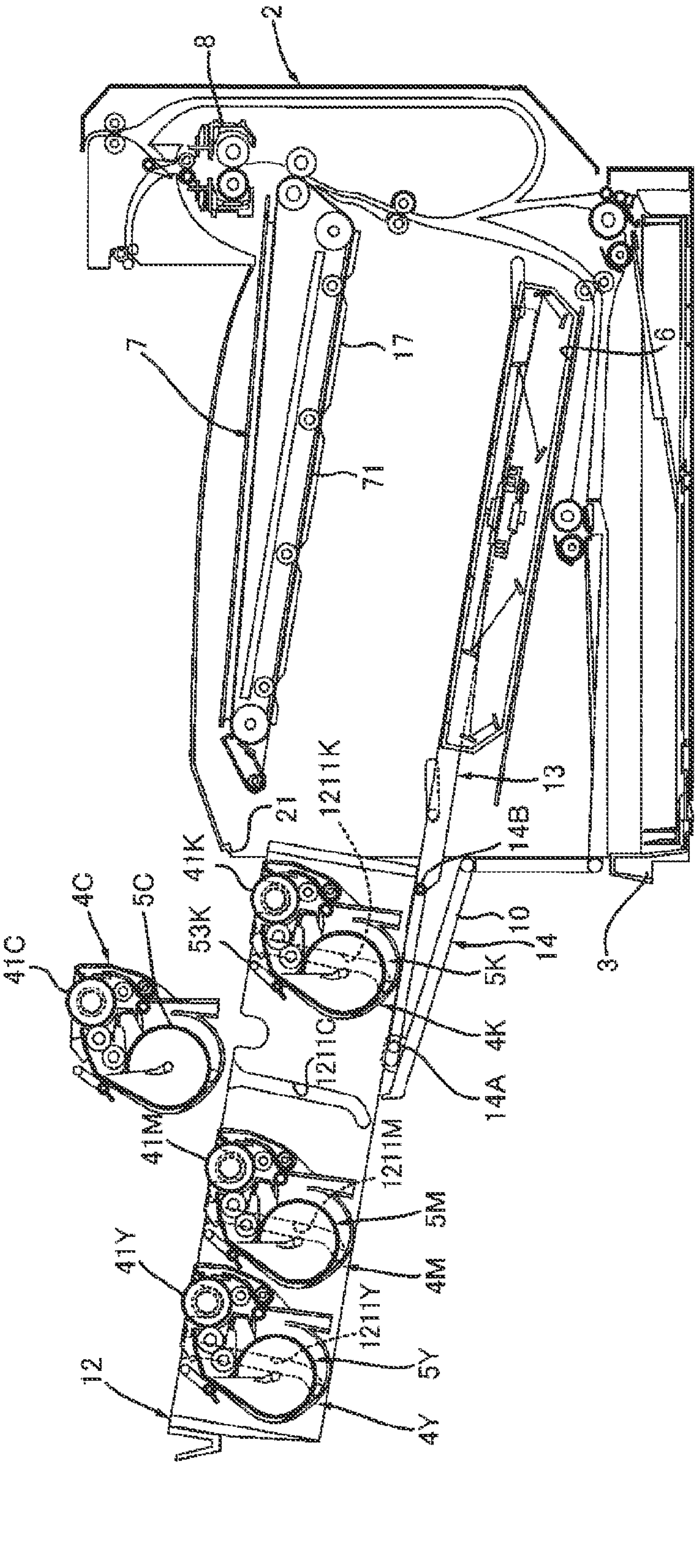
FIG. 2 is a schematic configuration view of the image forming apparatus, showing a state where the cover is located in an open position and the drawer is located in a drawn position.

As shown in FIGS. 1 and 2, the cover 10 is movable between a closed position (refer to FIG. 1) and an open position (refer to FIG. 2). In a state where the cover 10 is located in the closed position, the cover 10 closes the opening 21 (refer to FIG. 1). In a state where the cover 10 is located in the open position, the opening 21 is opened (refer to FIG. 2).

1.3 Sheet Cassette 3 and First Feed Roller R1

As shown in FIG. 1, the sheet cassette 3 accommodates sheets S. The sheets S in the sheet cassette 3 are each conveyed toward a secondary transfer roller 73. The secondary transfer roller 73 will be described later.

The first feed roller R1 conveys each of the sheets S in the sheet cassette 3 toward the secondary transfer roller 73.

1.4 Manual Tray T and Second Feed Roller R2

The manual tray T is located between the sheet cassette 3 and the exposure device 6. The manual tray T can support the sheets S.

The second feed roller R2 conveys each of the sheets S in the sheet cassette 3 toward the secondary transfer roller 73.

1.5 Drawer 12

As shown in FIGS. 1 and 2, in the state where the cover 10 is located in the open position, the drawer 12 is movable between a housing position (refer to FIG. 1) and a drawn position (refer to FIG. 2) through the opening 21. In a state where the drawer 12 is located in the housing position, the drawer 12 is entirely accommodated in the housing 2 (refer to FIG. 1). In the state where the drawer 12 is located in the housing position, the drawer 12 is located between the exposure device 6 and the transfer device 7 in the upper and lower direction. In a state where the drawer 12 is located in the drawn position, at least a part of the drawer 12 is drawn from the housing 2 (refer to FIG. 2). In other words, in the state where the drawer 12 is located in the drawn position, at least a part of the drawer 12 is located outside the housing 2.

1.6 Four Drum Cartridges 4Y, 4M, 4C and 4K

The four drum cartridges 4Y, 4M, 4C and 4K are mountable to and removable from the drawer 12. In a state where the four drum cartridges 4Y, 4M, 4C and 4K are mounted to the drawer 12, the four drum cartridges 4Y, 4M, 4C and 4K are aligned in corresponding order in the horizontal direction.

1.6.1 Drum Cartridge 4K

In the state where the drawer 12 is located in the drawn position, the drum cartridge 4K is mountable to and removable from the drawer 12 (refer to FIG. 2). In a state where the drum cartridge 4K is mounted to the drawer 12 and the drawer 12 is located in the drawn position, the drum cartridge 4K is located outside the housing 2.

In the state where the drawer 12 is located in the housing position, the drum cartridge 4K is prevented from being mounted to and removed from the drawer 12 (refer to FIG. 1). In a state where the drum cartridge 4K is mounted to the drawer 12 and the drawer 12 is located in the housing position, the drum cartridge 4K is located inside the housing 2.

Figure 3:
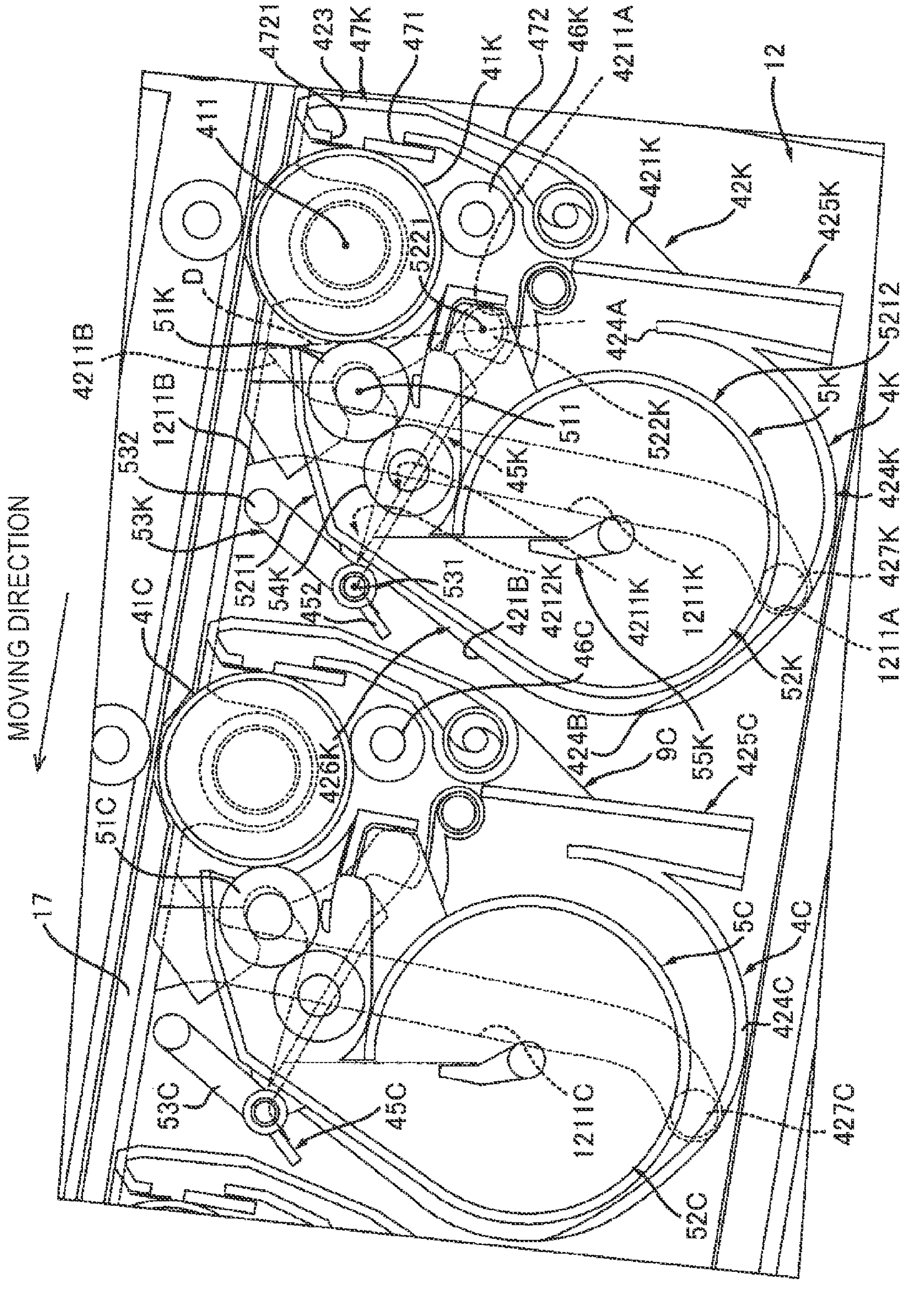
FIG. 3 is an enlarged view of a drum cartridge shown in FIG. 1, showing a state where a drum cartridge is mounted to a drawer.

As shown in FIG. 3, the drum cartridge 4K includes a photosensitive drum 41K, and a charging device 46K.

The photosensitive drum 41K extends in a first direction. The photosensitive drum 41K has a cylindrical shape. The photosensitive drum 41K is rotatable about a drum axis 411. The drum axis 411 extends in the first direction.

The charging device 46K charges a circumferential surface of the photosensitive drum 41K. The charging device 46K is, specifically, a charging roller. Note that, the charging device 46K may also be a scorotron-type charger.

1.6.2 Drum Cartridges 4Y, 4M and 4C

As shown in FIG. 1, the three drum cartridges 4Y, 4M and 4C are described in a similar manner to the drum cartridge 4K. For this reason, the descriptions of the drum cartridges 4Y, 4M and 4C are omitted.

The drum cartridge 4Y is mountable to and removable from the drawer 12. The drum cartridge 4Y includes a photosensitive drum 41Y, and a charging device 46Y. The drum cartridge 4M is mountable to and removable from the drawer 12. The drum cartridge 4M includes a photosensitive drum 41M, and a charging device 46M. The drum cartridge 4C is mountable to and removable from the drawer 12. The drum cartridge 4C includes a photosensitive drum 41C, and a charging device 46C.

Figure 6:
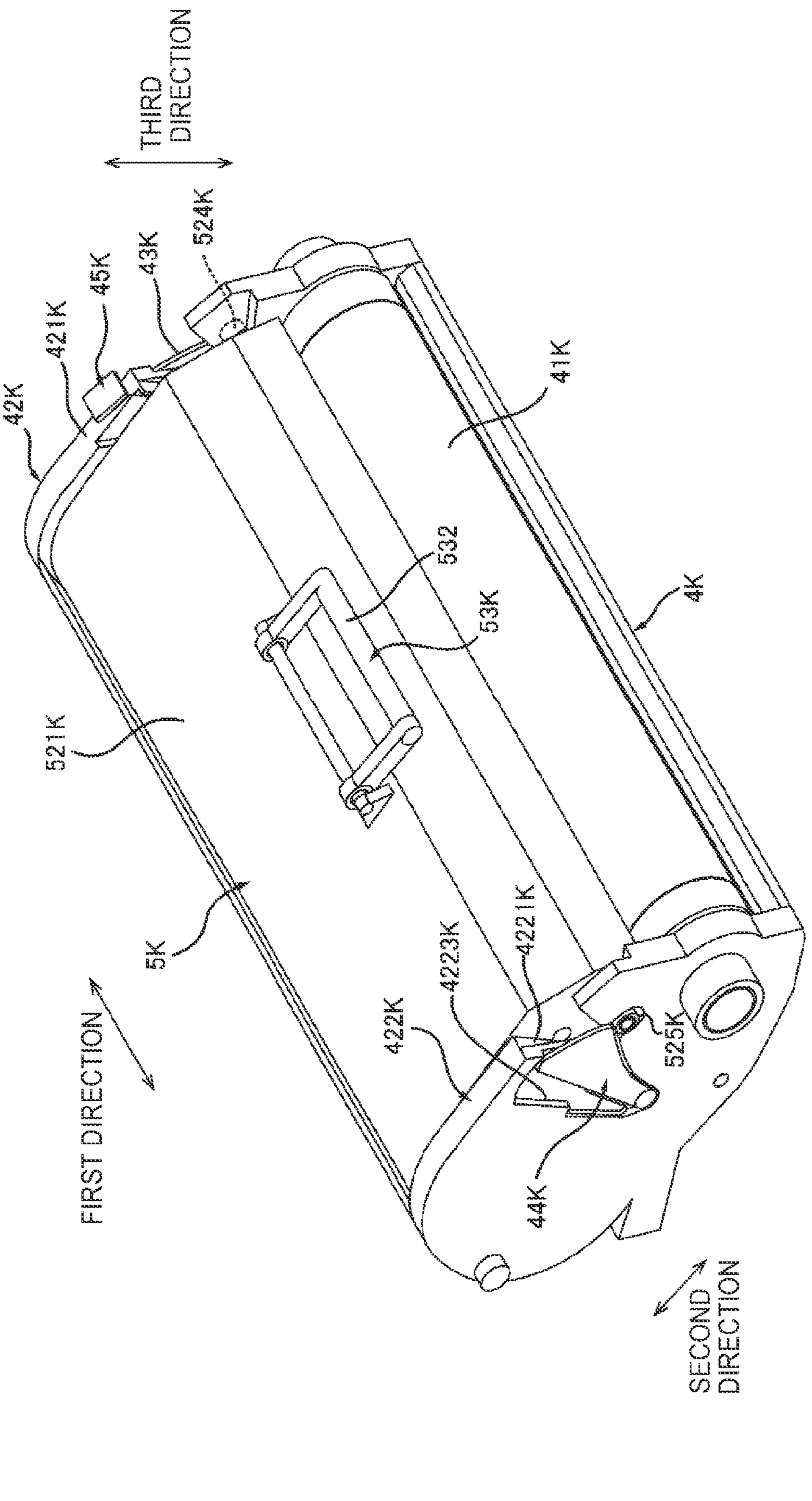
FIG. 6 is a perspective view showing a state where the developing cartridge is mounted to the drum cartridge shown in FIG. 4.

1.7 Four Developing Cartridges 5Y, 5M, 5C and 5K 1.7.1 Developing Cartridge 5K In a state where the drum cartridge 4K is removed from the drawer 12, the developing cartridge 5K is mountable to and removable from the drum cartridge 4K (refer to FIG. 6). For this reason, the developing cartridge 5K including the developing roller 51K and the drum cartridge 4K including the photosensitive drum 41K can be individually replaced. As shown in FIG. 3, in a state where the drum cartridge 4K is mounted to the drawer 12, the developing cartridge 5K is prevented from being mounted to and removed from the drum cartridge 4K.

The developing cartridge 5K includes a developing frame 52K, and a developing roller 51K.

The developing frame 52K accommodates toner. The developing frame 52K supports the developing roller 51K.

The developing roller 51K extends in the first direction. The developing roller 51K is rotatable about an axis 511. The axis 511 extends in the first direction.

In a state where the developing cartridge 5K is mounted to the drum cartridge 4K, the developing roller 51K is in contact with the photosensitive drum 41K. In the state where the developing roller 51K is in contact with the photosensitive drum 41K, the developing roller 51K supplies toner to the photosensitive drum 41K.

1.7.2 Developing Cartridges 5Y, 5M and 5C

As shown in FIG. 1, the three developing cartridges 5Y, 5M and 5C are described in a similar manner to the developing cartridge 5K. For this reason, the descriptions of the developing cartridges 5Y, 5M and 5C are omitted.

The developing cartridge 5Y is mountable to and removable from the drum cartridge 4Y. The developing cartridge 5Y includes a developing frame 52Y, and a developing roller 51Y. The developing cartridge 5M is mountable to and removable from the drum cartridge 4M. The developing cartridge 5M includes a developing frame 52M, and a developing roller 51M. The developing cartridge 5C is mountable to and removable from the drum cartridge 4C. The developing cartridge 5C includes a developing frame 52C, and a developing roller 51C.

1.8 Exposure Device 6

The exposure device 6 exposes surfaces of the four photosensitive drums 41Y, 41M, 41C and 41K. The exposure device 6 emits light for exposing the charged surfaces of the photosensitive drums 41Y, 41M, 41C and 41K. Thereby, an electrostatic latent image is formed on each of the surfaces of the photosensitive drums 41Y, 41M, 41C and 41K. The toner is supplied to the electrostatic latent images.

In a state where the four drum cartridges 4Y, 4M, 4C and 4K are mounted to the drawer 12 and the drawer 12 is located in the housing position, the exposure device 6 is located below the four drum cartridges 4Y, 4M, 4C and 4K.

The exposure device 6 is, specifically, a laser scan unit. Note that, the exposure device 6 may also be an LED array.

1.9 Transfer Device 7

The transfer device 7 transfers the toners on the four photosensitive drums 41Y, 41M, 41C and to the sheet S. In the state where the four drum cartridges 4Y, 4M, 4C and 4K are mounted to the drawer 12 and the drawer 12 is located in the housing position, the transfer device 7 is locate above the four drum cartridges 4Y, 4M, 4C and 4K.

The transfer device 7 includes an intermediate transfer belt 71, four primary transfer rollers 72Y, 72M, 72C and 72K, and a secondary transfer roller 73.

In a state where the four drum cartridges 4Y, 4M, 4C and 4K are mounted to the drawer 12, the drawer 12 is located in the housing position and the cover 10 is located in the closed position, the four photosensitive drums 41Y, 41M, 41C and 41K are in contact with the intermediate transfer belt 71. In the state where the four drum cartridges 4Y, 4M, 4C and 4K are mounted to the drawer 12 and the drawer 12 is located in the housing position, the intermediate transfer belt 71 passes between the photosensitive drum 41Y and the primary transfer roller 72Y, between the photosensitive drum 41M and the primary transfer roller 72M, between the photosensitive drum 41C and the primary transfer roller 72C and between the photosensitive drum 41K and the primary transfer roller 72K.

The primary transfer roller 72Y transfers the toner on the photosensitive drum 41Y to the intermediate transfer belt 71. The primary transfer roller 72M transfers the toner on the photosensitive drum 41M to the intermediate transfer belt 71. The primary transfer roller 72C transfers the toner on the photosensitive drum 41C to the intermediate transfer belt 71. The primary transfer roller 72K transfers the toner on the photosensitive drum 41K to the intermediate transfer belt 71.

The secondary transfer roller 73 is aligned with the intermediate transfer belt 71 in the horizontal direction. The secondary transfer roller 73 is in contact with the intermediate transfer belt 71. The sheet S conveyed from the sheet cassette 3 passes between the intermediate transfer belt 71 and the secondary transfer roller 73. At this time, the secondary transfer roller 73 transfers the toners transferred to the intermediate transfer belt 71 to the sheet S.

1.10 Fixing Device 8

The fixing device 8 fixes the toner on the sheet S by heating and pressurizing the sheet S having the toners transferred thereon. The sheet S passing through the fixing device 8 is discharged to an upper surface of the housing 2.

2. Details of Drawer 12

Subsequently, the drawer 12 is described in detail with reference to FIG. 1.

The drawer 12 includes a first drawer side plate 121, and a second drawer side plate (not shown).

The first drawer side plate 121 is located at one end of the drawer 12 in the first direction. The second drawer side plate (not shown) is located at the other end of the drawer 12 in the first direction. The second drawer side plate (not shown) is described in a similar manner to the first drawer side plate 121. For this reason, the first drawer side plate 121 is described in detail, and the description of the second drawer side plate (not shown) is omitted.

In the state where the four drum cartridges 4Y, 4M, 4C and 4K are mounted to the drawer 12, the first drawer side plate 121 is aligned with the four drum cartridges 4Y, 4M, 4C and 4K in the first direction. The first drawer side plate 121 has four drum guides 1211Y, 1211M, 1211C and 1211K. In other words, the drawer 12 has the four drum guides 1211Y, 1211M, 1211C and 1211K. The four drum guides 1211Y, 1211M, 1211C and 1211K are aligned with each other at intervals in a moving direction when the drawer 12 moves from the housing position to the drawn position.

The four drum guides 1211Y, 1211M, 1211C and 1211K have the same structure. For this reason, the drum guide 1211K is described in detail, and the descriptions of the three drum guides 1211Y, 1211M and 1211C are omitted.

As shown in FIG. 3, the drum guide 1211K guides the drum cartridge 4K to be mounted to and removed from the drawer 12. When the drum cartridge 4K is mounted to and removed from the drawer 12, the drum guide 1211K guides a drum boss 427K. The drum boss 427K will be described later. The drum guide 1211K is, specifically, a groove. The drum guide 1211K extends in the upper and lower direction.

The drum guide 1211K has a first end 1211A, and a second end 1211B. The first end 1211A is a lower end of the drum guide 1211K. In the state where the drum cartridge 4K is mounted to the drawer 12, the drum boss 427K is located at the first end 1211A. The second end 1211B is away from the first end 1211A. The second end 1211B is an upper end of the drum guide 1211K. The second end 1211B is opened upward.

3. Details of Drum Cartridge 4K

Subsequently, the drum cartridge 4K is described in detail with reference to FIGS. 3 and 4.

Figure 4:
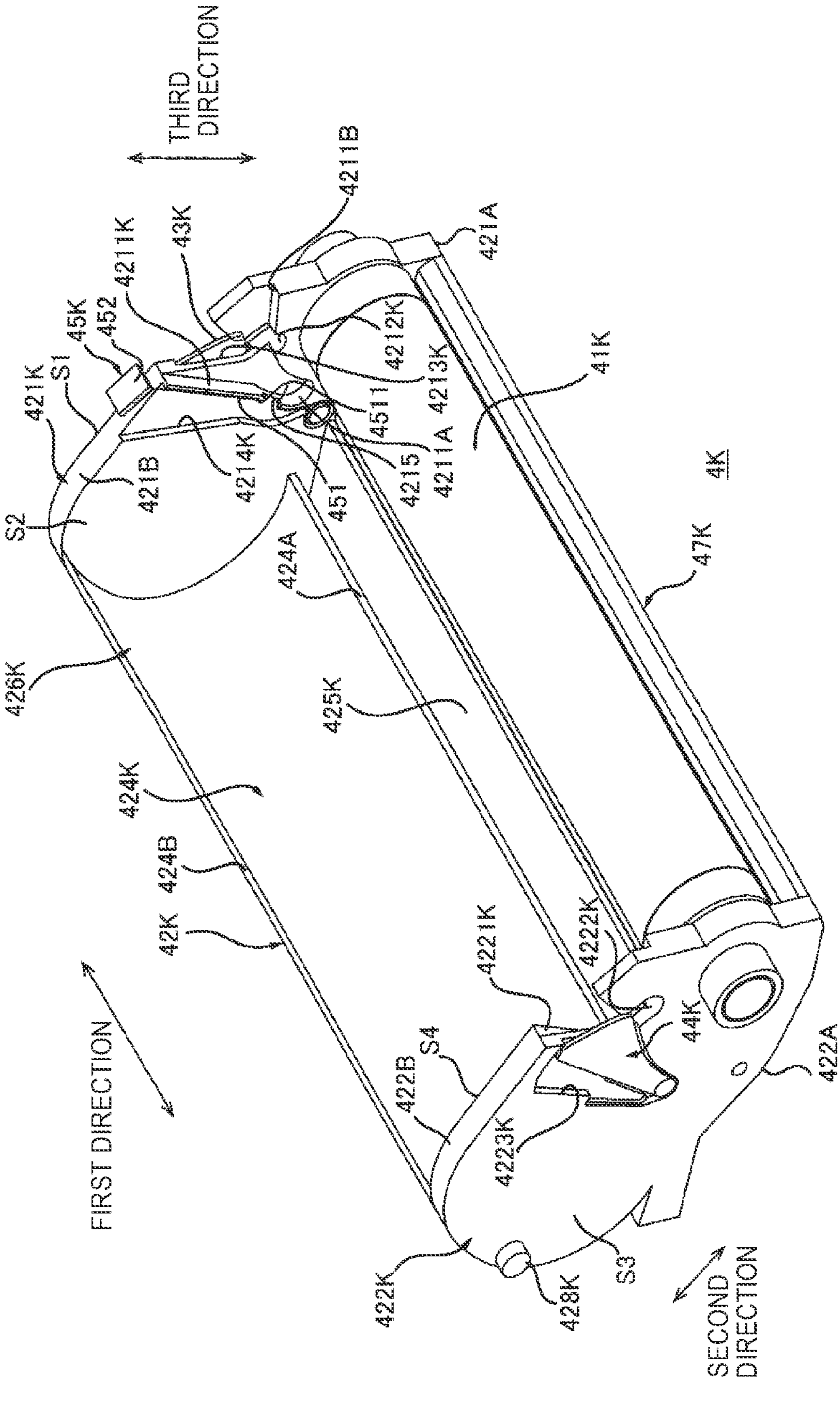
FIG. 4 is a perspective view of the drum cartridge shown in FIG. 3.

As shown in FIGS. 3 and 4, the drum cartridge 4K includes a drum frame 42K, a drum cleaner 47K, a first pressing member 43K, a second pressing member 44K, a lock 45K, in addition to the photosensitive drum 41K and the charging device 46K.

3.1 Drum Frame 42K

The drum frame 42K supports the photosensitive drum 41K, the charging device 46K, the drum cleaner 47K, the first pressing member 43K, the second pressing member 44K, and the lock 45K. The drum frame 42K extends in the first direction. The drum frame 42K includes a first side plate 421K, a second side plate 422K, drum bosses 427K and 428K, a bottom plate 424K, and a light penetrating part 425K.

3.1.1 First Side Plate 421K

As shown in FIG. 4, the first side plate 421K is located at one end of the drum frame 42K in the first direction.

The first side plate 421K has an outer surface S1 and an inner surface S2 in the first direction. The outer surface S1 is located on an opposite side to the second side plate 422K with respect to the inner surface S2 in the first direction.

The first side plate 421K extends in a second direction. The second direction intersects with the first direction. One end of the first side plate 421K in the second direction supports one end of the photosensitive drum 41K in the first direction.

The first side plate 421K has a first end 421A and a second end 421B in a third direction. The third direction intersects with the first direction and the second direction. The second end 421B is located away from the first end 421A in the third direction.

The first side plate 421K includes a first developing guide 4211K, a second developing guide 4212K, a first groove 4213K, and a second groove 4214K.

The first developing guide 4211K guides the developing cartridge 5K to be mounted to and removed from the drum cartridge 4K. When the developing cartridge 5K is mounted to and removed from the drum cartridge 4K, the first developing guide 4211K guides a first boss 522K (refer to FIG. 3). The first boss 522K will be described later. The first developing guide 4211K is located on the inner surface S2 of the first side plate 421K. The first developing guide 4211K is, specifically, a groove. The first developing guide 4211K extends in a circumferential direction of the photosensitive drum 41K (refer to FIG. 3). The first developing guide 4211K is located away from the photosensitive drum 41K in a radial direction of the photosensitive drum 41K.

The first developing guide 4211K has a first end 4211A, and a second end 4211B. The second end 4211B is located away from the first end 4211A in the third direction. The second end 4211B is located at the second end 421B of the first side plate 421. The second end 4211B is opened.

As shown in FIG. 3, in the state where the drum cartridge 4K is mounted to the drawer 12, an extension direction of the first developing guide 4211K intersects with an extension direction of the drum guide 1211K. In a state where the drum cartridge 4K and the drum cartridge 4C are mounted to the drawer 12, the first end 4211A of the first developing guide 4211K is located opposite to the drum cartridge 4C with respect to the second end 4211B in a moving direction in which the drawer 12 moves from the housing position to the drawn position. In other words, in the state where the drum cartridge 4K and the drum cartridge 4C are mounted to the drawer 12, the first developing guide 4211K extends from the first end 4211A to the second end 4211B toward the drum cartridge 4C.

Thereby, in a state where the developing cartridge 5K is mounted to the drum cartridge 4K and the drum cartridge 4K is mounted to the drawer 12, the drum cartridge 4K can be removed from the drawer 12 but the developing cartridge 5K is prevented from being removed from the drum cartridge 4K.

Figure 7:
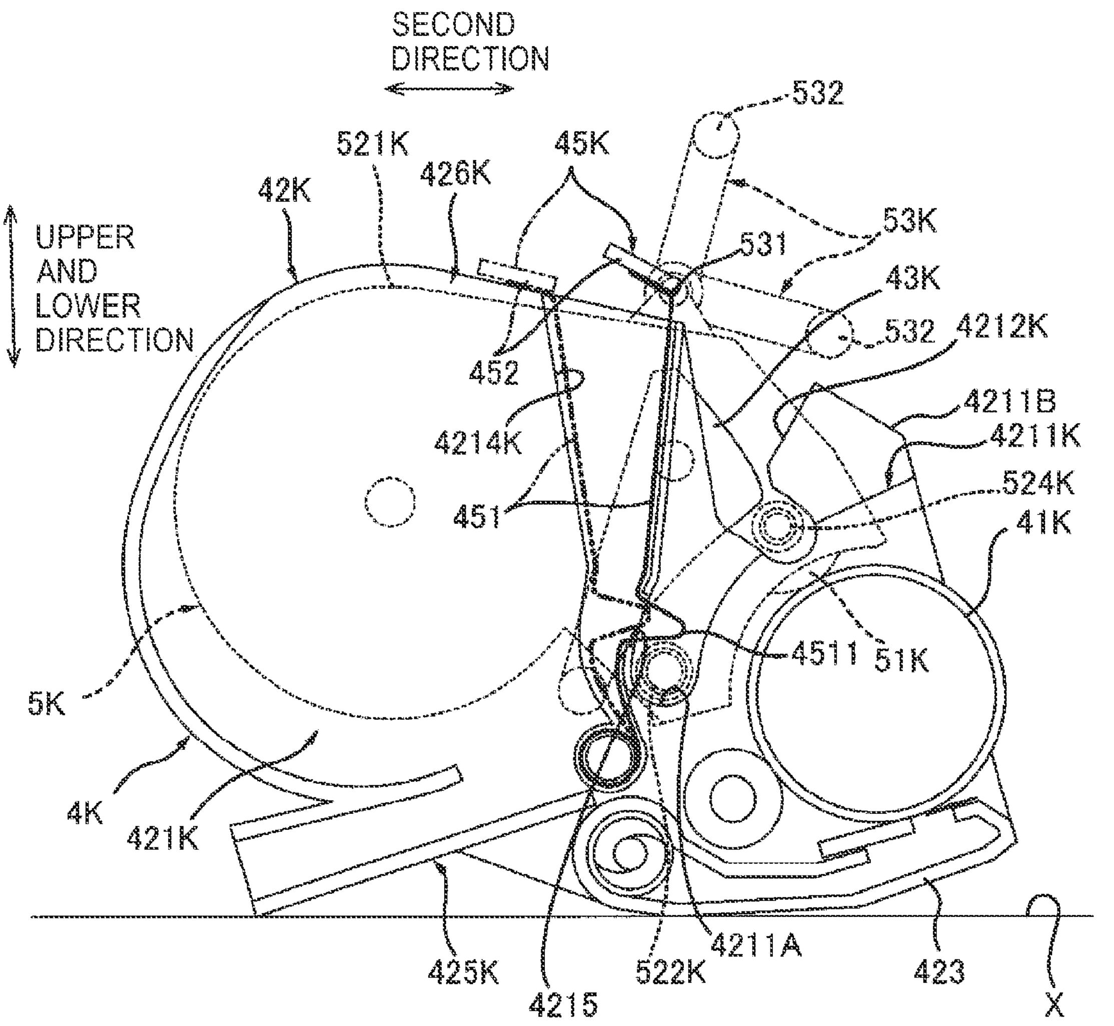
FIG. 7 illustrates a state where the drum cartridge shown in FIG. 6 is placed on a placement surface.

As shown in FIG. 4, when the developing cartridge 5K rotates with respect to the photosensitive drum 41K, the second developing guide 4212K guides a second boss 524K (refer to FIG. 7). The second boss 524K will be described later. The second developing guide 4212K is located inside the first developing guide 4211K. The second developing guide 4212K penetrates the first side plate 421K in the first direction.

In the first groove 4213K, the first pressing member 43K is arranged. The first groove 4213K is located in the outer surface S1 of the first side plate 421K. The first groove 4213K is located opposite to the photosensitive drum 41K with respect to the second developing guide 4212K. The first groove 4213K communicates with the second developing guide 4212K.

In the second groove 4214K, the lock 45K is arranged. The second groove 4214K is located in the inner surface S2 of the first side plate 421K. The second groove 4214K is located opposite to the photosensitive drum 41K with respect to the first developing guide 4211K. The second groove 4214K communicates with the first developing guide 4211K via an opening 4215.

3.1.2 Second Side Plate 422K

The second side plate 422K is located at the other end of the drum frame 42K in the first direction. The second side plate 422K is located away from the first side plate 421K in the first direction.

The second side plate 422K has an outer surface S3 and an inner surface S4 in the first direction. The outer surface S3 is located opposite to the first side plate 421K with respect to the inner surface S4 in the first direction.

The second side plate 422K extends in the second direction. One end of the second side plate 422K in the second direction supports the other end of the photosensitive drum 41K in the first direction.

The second side plate 422K has a first end 422A and a second end 422B in the third direction. The second end 422B is located away from the first end 422A in the third direction.

The second side plate 422K includes a first developing guide 4221K, a second developing guide 4222K, and a first groove 4223K.

The first developing guide 4221K guides the developing cartridge 5K to be mounted to and removed from the drum cartridge 4K, together with the first developing guide 4211K. When the developing cartridge 5K is mounted to and removed from the drum cartridge 4K, the first developing guide 4221K guides a first boss 523K (refer to FIG. 5). The first boss 523K will be described later. The first developing guide 4221K is located on the inner surface S4 of the second side plate 422K. The first developing guide 4221K is described in a similar manner to the first developing guide 4211K. For this reason, the description of the first developing guide 4221K is omitted.

Figure 5:
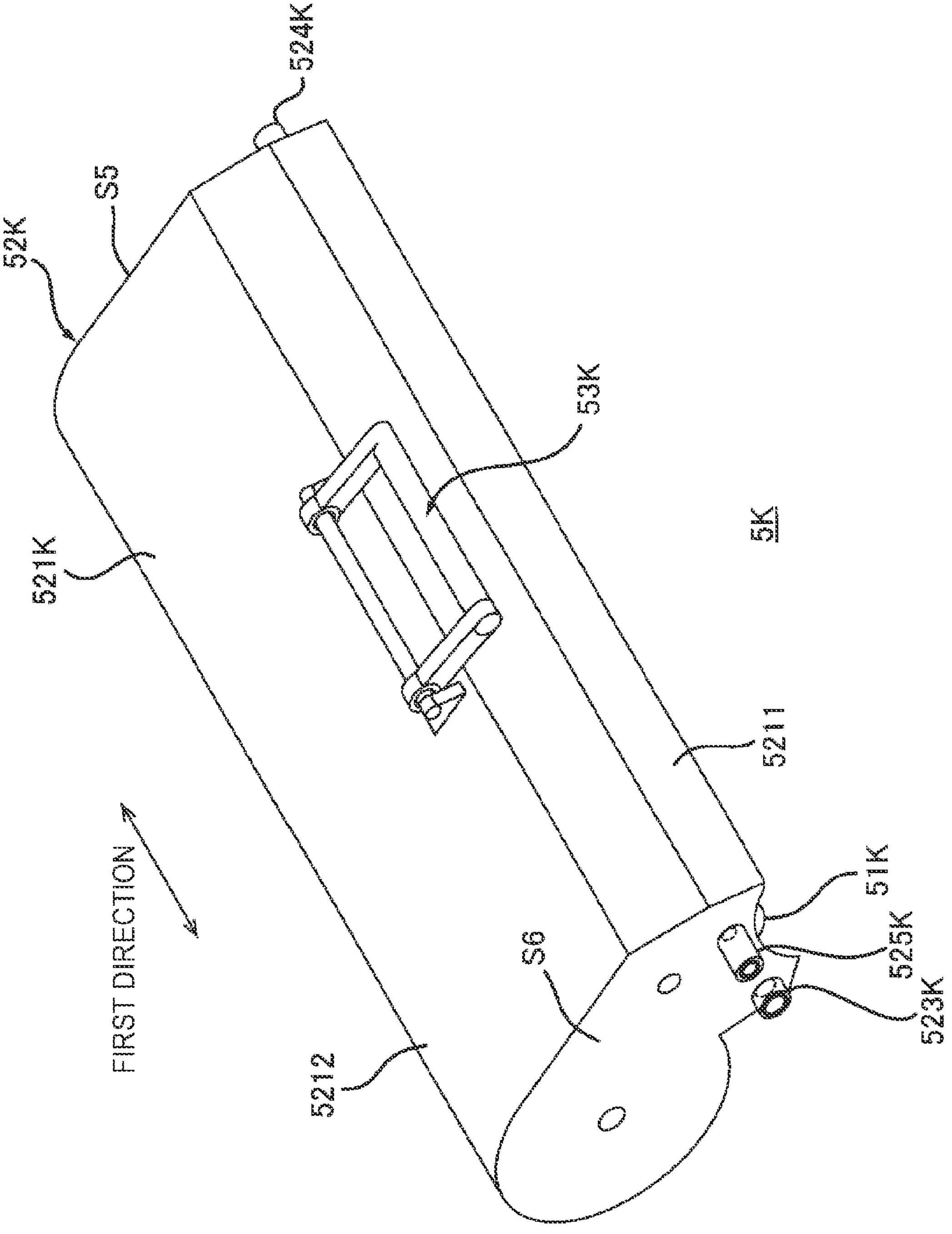
FIG. 5 is a perspective view of a developing cartridge shown in FIG. 3.

When the developing cartridge 5K rotates with respect to the photosensitive drum 41K, the second developing guide 4222K guides a second boss 525K (refer to FIG. 5). The second boss 525K will be described later. The second developing guide 4222K is located inside the first developing guide 4221K. The second developing guide 4222K penetrates the second side plate 422K in the first direction.

In the first groove 4223K, the second pressing member 44K is arranged. The first groove 4223K is located in the outer surface S3 of the second side plate 422K. The first groove 4223K is located opposite to the photosensitive drum 41K with respect to the second developing guide 4222K. The first groove 4223K communicates with the second developing guide 4222K.

3.1.3 Drum Bosses 427K and 428K

The drum boss 427K is located on the outer surface S1 of the first side plate 421K. As shown in FIG. 3, the drum boss 427K has a circular column shape. The drum boss 427K extends in the first direction. In the state where the drum cartridge 4K is mounted to the drawer 12, the drum boss 427K is fitted to the first end 1211A of the drum guide 1211K.

As shown in FIG. 4, the drum boss 428K is located on the outer surface S3 of the second side plate 422K. The drum boss 428K is described in a similar manner to the drum boss 427K. For this reason, the description of the drum boss 428K is omitted.

3.1.4 Bottom Plate 424K

The bottom plate 424K extends in the first direction. One end of the bottom plate 424K in the first direction is connected to the first side plate 421K. The other end of the bottom plate 424K in the first direction is connected to the second side plate 422K. The bottom plate 424K is located away from the photosensitive drum 41K in the second direction.

The bottom plate 424K has an arc shape. The bottom plate 424K has a first end 424A and a second end 424B in a circumferential direction of the bottom plate 424K. The first end 424A is located between the first end 421A of the first side plate 421K and the first end 422A of the second side plate 422K in the first direction. The second end 424B is away from the first end 424A in the third direction.

3.1.5 Light Penetrating Part 425K

During an image forming operation of the image forming apparatus 1, light emitted from the exposure device 6 passes through the light penetrating part 425K toward the photosensitive drum 41K (refer to FIG. 1). As shown in FIG. 3, the light penetrating part 425K faces the photosensitive drum 41K in the radial direction of the photosensitive drum 41K. The light penetrating part 425K extends in the first direction and also extends in the radial direction of the photosensitive drum 41K. The light penetrating part 425K is connected to the first end 424A of the bottom plate 424K.

3.1.6 Opening 426K

As shown in FIG. 4, the drum frame 42K has an opening 426K. When the developing cartridge 5K is mounted to and removed from the drum cartridge 4K, the developing cartridge 5K passes through the opening 426K. The opening 426K is demarcated by the second end 421B of the first side plate 421K, the second end 422B of the second side plate 422K, the second end 424B of the bottom plate 424K, and the photosensitive drum 41K. The first developing guides 4211K and 4221K extend toward the opening 426K. As shown in FIG. 3, in the state where the drum cartridge 4K and the drum cartridge 4C are mounted to the drawer 12, the opening 426K is opened toward the drum cartridge 4C.

3.2 Drum Cleaner 47K

As shown in FIG. 4, the drum cleaner 47K cleans the surface of the photosensitive drum 41K. The drum cleaner 47K is located between the first end 421A of the first side plate 421K and the first end 422A of the second side plate 422K in the first direction. The drum cleaner 47K is located opposite to the bottom plate 424K with respect to the light penetrating part 425K in the second direction.

As shown in FIG. 3, in the state where the developing cartridge 5K is mounted to the drum cartridge 4K, the drum cleaner 47K is located opposite to the developing roller 51K with respect to the drum axis 411 of the photosensitive drum 41K in the third direction. The drum cleaner 47K includes a cleaning blade 471, and a cleaner housing 472.

An edge of the cleaning blade 471 is in contact with the surface of the photosensitive drum 41K. When the photosensitive drum 41K rotates, the cleaning blade 471 scrapes off toner remaining on the surface of the photosensitive drum 41K from the surface of the photosensitive drum 41K, as waste toner.

The cleaner housing 472 accommodates the waste toner. The cleaner housing 472 supports the cleaning blade 471. The cleaner housing 472 has an opening 4721. The opening 4721 receives the waste toner scraped off by the cleaning blade 471.

The cleaner housing 472 includes a wall 423. In other words, the drum cartridge 4K includes the wall 423. The wall 423 is located opposite to the developing roller 51K with respect to the photosensitive drum 41K in the state where the developing cartridge 5K is mounted to the drum cartridge 4K. The wall 423 is located opposite to the photosensitive drum 41K with respect to the cleaning blade 471. The first developing guide 4211 extends from the first end 4211A toward the second end 4211B in a direction away from the wall 423.

3.3 First Pressing Member 43K and Second Pressing Member 44K

As shown in FIG. 4, in the state where the developing cartridge 5K is mounted to the drum cartridge 4K, the first pressing member 43K presses the developing roller 51K toward the photosensitive drum 41K (refer to FIG. 6). In the state where the developing cartridge 5K is mounted to the drum cartridge 4K, the first pressing member 43K is located opposite to the photosensitive drum 41K with respect to the second boss 524K, and is in contact with the second boss 524K (refer to FIG. 6). Thereby, in the state where the developing cartridge 5K is mounted to the drum cartridge 4K, the developing roller 51K can be stably brought into contact with the photosensitive drum 41K. The first pressing member 43K is supported by the drum frame 42K.

The first pressing member 43K is located in the first groove 4213K of the first side plate 421K. The first pressing member 43K is supported by the first side plate 421K. The first pressing member 43K is rotatable about an axis thereof. The axis of the first pressing member 43K extends in the first direction.

In the state where the developing cartridge 5K is mounted to the drum cartridge 4K, the second pressing member 44K presses the developing roller 51K toward the photosensitive drum 41K, together with the first pressing member 43K (refer to FIG. 6). In the state where the developing cartridge 5K is mounted to the drum cartridge 4K, the second pressing member 44K is located opposite to the photosensitive drum 41K with respect to the second boss 525K, and is in contact with the second boss 525K (refer to FIG. 6). The second pressing member 44K is supported by the drum frame 42K.

The second pressing member 44K is located in the first groove 4223K of the second side plate 422K. The second pressing member 44K is supported by the second side plate 422K. The second pressing member 44K is described in a similar manner to the first pressing member 43K. For this reason, the description of the second pressing member 44K is omitted.

3.4 Lock 45K

The lock 45K is movable between a lock position and an unlock position (refer to FIG. 7). In FIG. 7, the lock 45K located in the lock position is shown with a solid line, and the lock 45K located in the unlock position is shown with a dashed-two dotted line. In a state where the developing cartridge 5K is mounted to the drum cartridge 4K and the lock 45K is located in the lock position, the lock 45K restricts prevents the developing cartridge 5K from being removed from the drum cartridge 4K. Thereby, the developing cartridge 5K is unlikely removed from the drum cartridge 4K unintentionally. In a state where the developing cartridge 5K is mounted to the drum cartridge 4K and the lock 45K is located in the unlock position, the lock 45K releases the locked state of the developing cartridge 5K with respect to the drum cartridge 4K.

As shown in FIG. 4, the lock 45K is supported by the first side plate 421K. The lock 45K is urged toward the lock position. The lock 45K includes a spring 451 and an operation part 452.

The spring 451 is located in the second groove 4214K of the first side plate 421K. The spring 451 has a line shape. The spring 451 has one and the other end. The one end of the spring 451 is fixed to the first side plate 421K. The other end of the spring 451 is located away from the one end of the spring 451. The operation part 452 is provided at the other end of the spring 451. The spring 451 has a convex portion 4511. The convex portion 4511 is located between the one end and the other end of the spring 451. The convex portion 4511 has an apex facing toward the photosensitive drum 41K.

In the state where the lock 45K is located in the lock position, the convex portion 4511 passes through the opening 4215 and is located in the first developing guide 4211K. In the state where the developing cartridge 5K is mounted to the drum cartridge 4K and the lock 45K is located in the lock position, the convex portion 4511 prevents the first boss 522K from coming off from the first end 4211A of the first developing guide 4211K (refer to FIG. 7). In the state where the lock 45K is located in the unlock position, the convex portion 4511 is located in the second groove 4214K. In the state where the developing cartridge 5K is mounted to the drum cartridge 4K and the lock 45K is located in the unlock position, the first boss 522K is movable from the first end 4211A toward the second end 4211B of the first developing guide 4211K.

The operation part 452 is operated by a user. When the operation part 452 is operated by the user, the lock 45K is moved from the lock position to the unlock position.

4. Details of Developing Cartridge 5K

Subsequently, the developing cartridge 5K is described in detail with reference to FIGS. 3 and 5 to 7.

As shown in FIG. 3, the developing cartridge 5K includes a supply roller 54K, an agitator 55K, and a handle 53K, in addition to the developing roller 51K and the developing frame 52K.

4.1 Developing Frame 52K

As shown in FIG. 5, the developing frame 52K includes a developing housing 521K, two first bosses 522K and 523K (refer to FIG. 7), and two second bosses 524K and 525K.

As shown in FIG. 3, the developing housing 521K includes a developing part 5211, and a toner accommodation part 5212. The developing part 5211 supports the developing roller 51K and the supply roller 54K. The toner accommodation part 5212 accommodates toner. An internal space of the toner accommodation part 5212 communicates with an internal space of the developing part 5211. The toner accommodation part 5212 supports the agitator 55K. In the state where the developing cartridge 5K is mounted to the drum cartridge 4K and the drum cartridge 4K is mounted to the drawer 12, the toner accommodation part 5212 is located below the developing part 5211.

As shown in FIG. 5, the developing housing 521K extends in the first direction. The developing housing 521K has a first side surface S5 and a second side surface S6 in the first direction.

The first side surface S5 is located at one end of the developing frame 521 in the first direction. The second side surface S6 is located at the other end of the developing frame 521 in the first direction. The second side surface S6 is located away from the first side surface S5 in the first direction.

As shown in FIG. 6, in the state where the developing cartridge 5K is mounted to the drum cartridge 4K, the developing housing 521K of the developing cartridge 5K is located between the first side plate 421K and the second side plate 422K in the first direction.

The first boss 522K is located on the first side surface S5 of the developing frame 521. The first boss 522K is aligned with the developing part 5211 in the first direction. As shown in FIG. 3, the first boss 522K has a cylindrical shape. The first boss 522K extends in the first direction.

In the state where the developing cartridge 5K is mounted to the drum cartridge 4K, the first boss 522K is fitted to the first end 4211A of the first developing guide 4211K. In the state where the developing cartridge 5K is mounted to the drum cartridge 4K, the developing cartridge 5K is rotatable about an axis 5221 of the first boss 522K with respect to the photosensitive drum 41K. Thereby, the developing roller 51K is movable with respect to the photosensitive drum 41K. The axis 5221 of the first boss 522 overlaps a tangential direction D of a part of the photosensitive drum 41K in contact with the developing roller 51K.

As shown in FIG. 5, the first boss 523K is located on the second side surface S6 of the developing frame 521. The first boss 523K is described in a similar manner to the first boss 522K. For this reason, the description of the first boss 523K is omitted.

The second boss 524K is located on the first side surface S5 of the developing housing 521K. The second boss 524K is aligned with the developing part 5211 in the first direction. The second boss 524K is located away from the first boss 522K. The second boss 524K has a cylindrical shape. The second boss 524K extends along the axis 511 (refer to FIG. 3) of the developing roller 51K. The second boss 524K extends in the first direction.

As shown in FIG. 7, in the state where the developing cartridge 5K is mounted to the drum cartridge 4K, the second boss 524K is fitted to the second developing guide 4212K. The second boss 524K is pressed toward the photosensitive drum 41K by the first pressing member 43K.

As shown in FIG. 5, the second boss 525K is located on the second side surface S6 of the developing housing 521K. The second boss 525K is described in a similar manner to the second boss 524K. For this reason, the description of the second boss 525K is omitted.

4.2 Supply Roller 54K

As shown in FIG. 3, the supply roller 54K supplies toner to the developing roller 51K. The supply roller 54K is housed in the developing part 5211. In the state where the developing cartridge 5K is mounted to the drum cartridge 4K, the supply roller 54K is located opposite to the photosensitive drum 41K with respect to the developing roller 51K. The supply roller 54K extends in the first direction. The supply roller 54K is rotatable about an axis thereof. The axis of the supply roller 54K extends in the first direction.

4.3 Agitator 55K

The agitator 55K conveys the toner in the toner accommodation part 5212 toward the developing part 5211. The agitator 55K is housed in the toner accommodation part 5212. The agitator 55K is rotatable about an axis thereof. The axis of the agitator 55K extends in the first direction.

4.4 Handle 53K

As shown in FIG. 5, the handle 53K is located at a center of the developing cartridge 5K in the first direction. The handle 53K is attached to the developing frame 52K. The handle 53K is attached to a center of the developing housing 521K in the first direction.

As shown in FIG. 6, in the state where the developing cartridge 5K is mounted to the drum cartridge 4K, the handle 53K is away from the lock 45K in the first direction.

As shown in FIG. 7, in the state where the developing cartridge 5K is mounted to the drum cartridge 4K, the handle 53K is located opposite to the wall 423 with respect to the photosensitive drum 41K. The handle 53K is rotatable about an axis 531 between a first position and a second position.

In a state where the handle 53K is located in the first position, the handle 53K intersects with the extension direction of the first developing guide 4211K. In a state where the developing cartridge 5K is mounted to the drum cartridge 4K and the handle 53K is located in the second position, the handle 53K extends in the extension direction of the first developing guide 4211K. For this reason, in a state where the drum cartridge 4K is removed from the drawer 12 and is placed and the developing cartridge 5K is mounted to the drum cartridge 4K, when the user pulls up the developing cartridge 5K in the extension direction of the first developing guide 4211K with gripping the handle 53K, the handle 53K is located in the second position, so that the first boss 522K smoothly comes off from the first developing guide 4211K. For this reason, the developing cartridge 5K can be smoothly removed from the drum cartridge 4K.

As shown in FIG. 3, the handle 53K includes a grip 532. The grip 532 can be grasped by the user. The grip 532 is located away from the axis 531.

In a state where the developing cartridge 5K is mounted to the drum cartridge 4K, the drum cartridge 4K is mounted to the drawer 12 and the handle 53K is located in the first position, the grip 532 is located above the axis 511. In the state where the developing cartridge 5K is mounted to the drum cartridge 4K and the drum cartridge 4K is mounted to the drawer 12, the grip 532 of the handle 53K is located above the developing frame 52K.

In the state where the developing cartridge 5K is mounted to the drum cartridge 4K and the drum cartridge 4K is mounted to the drawer 12, the lock 45K is located below the grip 532 of the handle 53K. In a state where the developing cartridge 5K is mounted to the drum cartridge 4K and the drum cartridge 4K and the drum cartridge 4C are mounted to the drawer 12, the operation part 452 of the lock 45K is located between the developing frame 52K and the drum cartridge 4C.

Thereby, in the state where the drum cartridge 4K and the drum cartridge 4C are mounted to the drawer 12, the operation part 452 of the lock 45K is not operated by the user. For this reason, in the state where the developing cartridge 5K is mounted to the drum cartridge 4K and the drum cartridge 4K and the drum cartridge 4C are mounted to the drawer 12, when the lock 45K is being located in the lock position, the developing cartridge 5K can be prevented from being removed from the drum cartridge 4K.

In the state where the developing cartridge 5K is mounted to the drum cartridge 4K and the drum cartridge 4K is mounted to the drawer 12, the handle 53K is located downstream of the photosensitive drum 41K with respect to the moving direction in which the drawer 12 moves from the housing position to the drawn position.

In the state where the developing cartridge 5K is mounted to the drum cartridge 4K and the drum cartridge 4K and the drum cartridge 4C are mounted to the drawer 12, the handle 53K is located between the developing frame 52K and the drum cartridge 4C.

In the state where the developing cartridge 5K is mounted to the drum cartridge 4K and the drum cartridge 4K and the drum cartridge 4C are mounted to the drawer 12, the grip 532 of the handle 53K is located between the photosensitive drum 41K and the photosensitive drum 41C.

For this reason, in the state where the developing cartridge 5K is mounted to the drum cartridge 4K and the drum cartridge 4K is mounted to the drawer 12, when the drawer 12 is located in the drawn position, the user can easily access the handle 53K located in the first position (refer to FIG. 2).

In the state where the developing cartridge 5K is mounted to the drum cartridge 4K and the drum cartridge 4K is mounted to the drawer 12, when the drawer 12 is located in the drawn position, the user can remove the developing cartridge 5K and the drum cartridge 4K from the drawer 12 by gripping and pulling up the handle 53K located in the first position. At this time, since the lock 45K is located in the lock position, the developing cartridge 5K and the drum cartridge 4K can be removed from the drawer 12 without the drum cartridge 4K being removed from the developing cartridge 5K.

5. Details of Image Forming Apparatus

Subsequently, the image forming apparatus 1 is described in detail with reference to FIGS. 1 to 3.

As shown in FIGS. 1 and 2, the image forming apparatus 1 includes a positioning plate 17, a drawer guide 13, and a link member 14.

5.1 Positioning Plate 17

As shown in FIG. 1, in a state where the four drum cartridges 4Y, 4M, 4C and 4K are mounted to the drawer 12, the drawer 12 is located in the housing position and the cover 10 is located in the closed position, the positioning plate 17 positions the four photosensitive drums 41Y, 41M, 41C and 41K with respect to the housing 2. The positioning plate 17 is supported by the housing 2. The positioning plate 17 is aligned with the transfer device 7 in the first direction.

5.2 Drawer Guide 13

As shown in FIGS. 1 and 2, the drawer guide 13 guides the drawer 12 to move with respect to the housing 2. The moving direction in which the drawer 12 moves from the housing position to the drawn position intersects with the horizontal direction. The drawer guide 13 is aligned with the exposure device 6 in the first direction. The drawer guide 13 is away from the transfer device 7 in the upper and lower direction.

The drawer guide 13 includes a guide body 131 and two bosses 132 and 133.

The guide body 131 extends in a direction of intersecting with the first direction and the upper and lower direction and also intersecting with the horizontal direction. The guide body 131 has a first end 131A, and a second end 131B. In the state where the cover 10 is located in the closed position, the second end 131B is located on an opposite side to the cover 10 with respect to the first end 131A. The second end 131B is located below the first end 131A. The guide body 131 is inclined downward from the first end 131A toward the second end 131B.

The boss 132 is provided at the first end 131A of the guide body 131. The boss 132 extends in the first direction. The boss 132 is fitted in a groove 22 of the housing 2. In other words, the housing 2 has the groove 22. The groove 22 guides the drawer guide 13 to move. The groove 22 extends in the horizontal direction.

The boss 133 is provided at the second end 131B of the guide body 131. The boss 133 extends in the first direction. The boss 133 is fitted in a groove 23 of the housing 2. In other words, the housing 2 has the groove 23. The groove 23 guides the drawer guide 13 to move, together with the groove 22. The groove 23 extends in the horizontal direction.

The drawer guide 13 moves between a contact position and a spaced position, in conjunction with the cover 10. Specifically, in the state where the four drum cartridges 4Y, 4M, 4C and 4K are mounted to the drawer 12 and the drawer 12 is located in the housing position, when the cover 10 is moved between the closed position and the open position, the drawer guide 13 moves between the contact position and the spaced position. When the drawer guide 13 is moved from the contact position to the spaced position, the drawer guide 13 moves toward the opening 21 in the horizontal direction.

In a state where the drum cartridge 4K is mounted to the drawer 12, the drawer 12 is located in the housing position and the drawer guide 13 is located in the contact position, the drawer guide 13 brings the photosensitive drum 41K into contact with the intermediate transfer belt 71 of the transfer device 7. At this time, the first side plate 421K contacts the positioning plate 17. Thereby, the photosensitive drum 41K contacts the intermediate transfer belt 71 and is positioned with respect to the housing 2.

As shown in FIG. 2, in a state where the drum cartridge 4K is mounted to the drawer 12 and the drawer guide 13 is located in the spaced position, the drawer guide 13 separates the photosensitive drum 41K from the intermediate transfer belt 71 of the transfer device 7. At this time, the first side plate 421K is spaced away from the positioning plate 17. Thereby, the photosensitive drum 41K is spaced away from the intermediate transfer belt 71 and the positioning with respect to the housing 2 is released.

5.3 Link Member 14

As shown in FIGS. 1 and 2, the link member 14 connects the cover 10 and the drawer guide 13 each other. The link member 14 links moving of the cover 10 between the closed position and the open position and moving of the drawer guide 13 between the contact position and the spaced position. The link member 14 locates the drawer guide 13 in the contact position in the state where the cover 10 is located in the closed position, and locates the drawer guide 13 in the spaced position in the state where the cover 10 is located in the open position.

The link member 14 has a first end 14A, and a second end 14B. The second end 14B is located away from the first end 14A. The first end 14A of the link member 14 is rotatably connected to the cover 10. The second end 14B of the link member 14 is rotatably connected to the first end 131A of the guide body 131.

6. Removing of Drum Cartridge 4K and Developing Cartridge 5K

Subsequently, removing of the drum cartridge 4K from the drawer 12 and removing of the developing cartridge 5K from the drum cartridge 4K are described with reference to FIGS. 1 to 3 and 7.

As shown in FIGS. 1 and 2, when removing the drum cartridge 4K from the drawer 12, the user moves the drawer 12 from the housing position to the drawn position.

As shown in FIG. 3, in the state where the developing cartridge 5K is mounted to the drum cartridge 4K and the drum cartridge 4K is mounted to the drawer 12, the drum guide 1211K extends in the upper and lower direction, and the extension direction of the first developing guide 4211K intersects with the extension direction of the drum guide 1211K. In the state where the developing cartridge 5K is mounted to the drum cartridge 4K and the drum cartridge 4K is mounted to the drawer 12, the lock 45K is located in the lock position, so that removing of the developing cartridge 5K with respect to the drum cartridge 4K is prevented.

For this reason, in the state where the developing cartridge 5K is mounted to the drum cartridge 4K, the drum cartridge 4K is mounted to the drawer 12 and the drawer 12 is located in the drawn position, when the user pulls up the handle 53K with gripping the grip 532, the drum cartridge 4K is removed from the drawer 12 in the state where the developing cartridge 5K is mounted to the drum cartridge 4K.

As shown in FIG. 7, the drum cartridge 4K can be placed on a placement surface X in a state of being removed from the drawer 12. The placement surface X extends, for example, in the horizontal direction.

In a state where the drum cartridge 4K is removed from the drawer 12 and is placed, the wall 423 and the light penetrating part 425K are in contact with the placement surface X. The first developing guide 4211K extends upward in the state where the drum cartridge 4K is removed from the drawer 12 and is placed.

Then, the lock 45K is moved from the lock position to the unlock position by the user. Then, when the user pulls up the handle 53K with gripping the grip 532, the handle 53K is moved from the first position to the second position.

In the state where the developing cartridge 5K is mounted to the drum cartridge 4K, when the drum cartridge 4K is removed from the drawer 12 and is placed and the handle 53K is located in the second position, the handle 53K extends upward from the developing housing 521K toward an opposite side to the wall 423.

For this reason, when the user pulls up the handle 53K, the developing cartridge 5K is smoothly removed from the drum cartridge 4K.

7. Operational Effects (1) In the image forming apparatus 1, in the state where the drawer 12 is located in the drawn position, the drum cartridge 4K is mountable to and removable from the drawer 12. In the state where the drum cartridge 4K is removed from the drawer 12, the developing cartridge 5K is mountable to and removable from the drum cartridge 4K.

Specifically, as shown in FIG. 2, in the state where the developing cartridge 5K is mounted to the drum cartridge 4K, the drum cartridge 4K is mounted to the drawer 12 and the drawer 12 is located in the drawn position, the user can easily recognize the handle 53K. Then, the user can remove the drum cartridge 4K from the drawer 12 with gripping the handle 53K in the state where the developing cartridge 5K is mounted to the drum cartridge 4K.

Thereafter, as shown in FIG. 7, the user moves the lock 45K from the lock position to the unlock position with gripping the handle 53K in the state where the drum cartridge 4K is placed, thereby removing the developing cartridge 5K from the drum cartridge 4K.

Therefore, after removing the drum cartridge 4K from the drawer 12, the user can remove the developing cartridge 5K from the drum cartridge 4K in the state where the drum cartridge 4K is placed.

For this reason, it is possible to individually and smoothly replace the developing cartridge 5K that accommodates toner and that includes the developing roller 51K, and the drum cartridge 4K including the photosensitive drum 41K.

8. Second Embodiment

Subsequently, a second embodiment is described with reference to FIGS. 8 to 12. In the second embodiment, the members similar to those of the first embodiment are denoted with the same reference signs, and the descriptions thereof are omitted.

8.1 Developing Cartridge 20K

Figure 8:
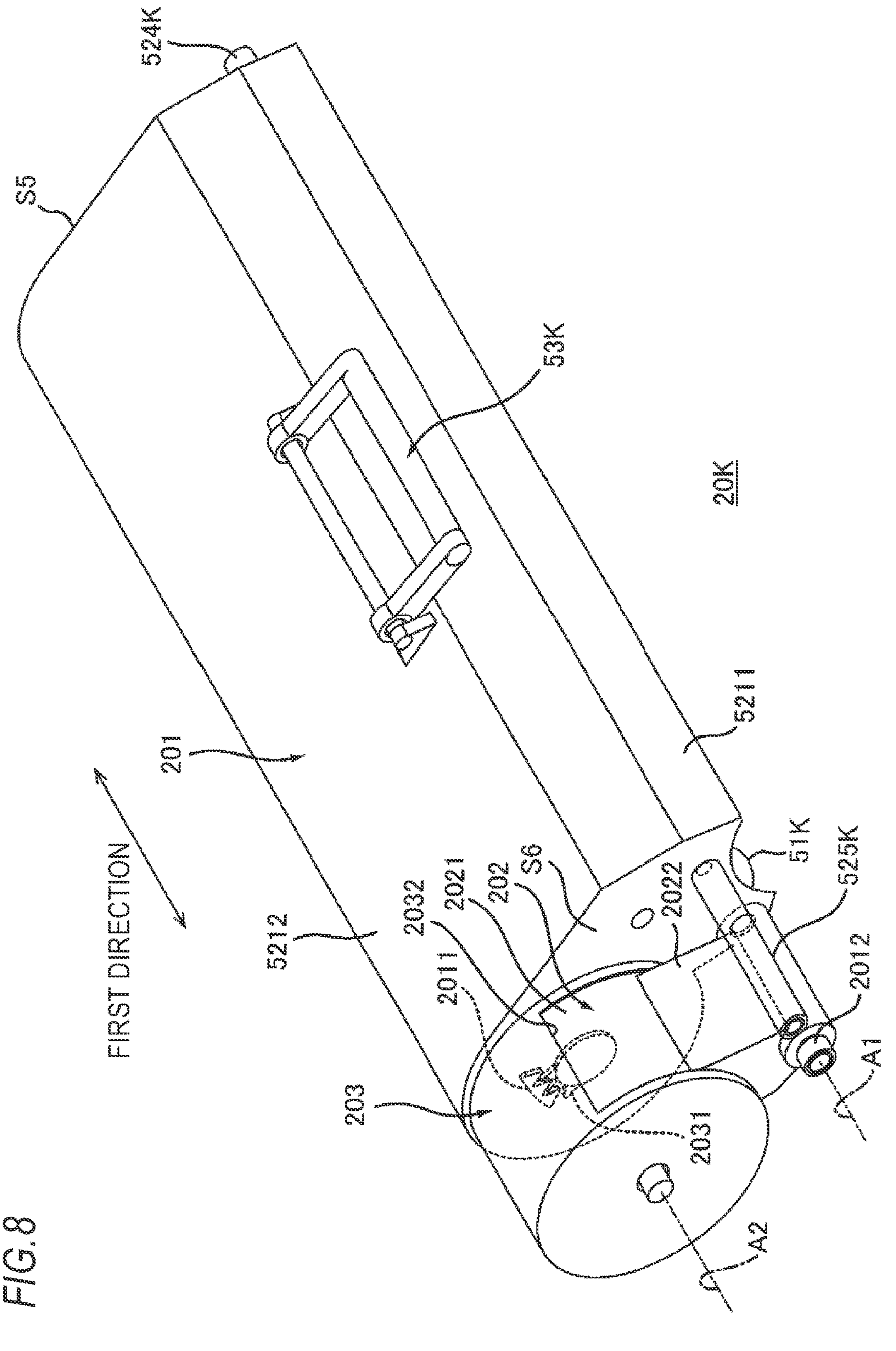
FIG. 8 is a perspective view of a developing cartridge of a second embodiment.

As shown in FIG. 8, a developing cartridge 20K includes a developing housing 201, a waste toner housing 202, and a first shutter 203, in addition to the developing roller 51K, the supply roller 54K, the agitator 55K and the handle 53K.

8.1.1 Developing Housing 201

Figure 9:
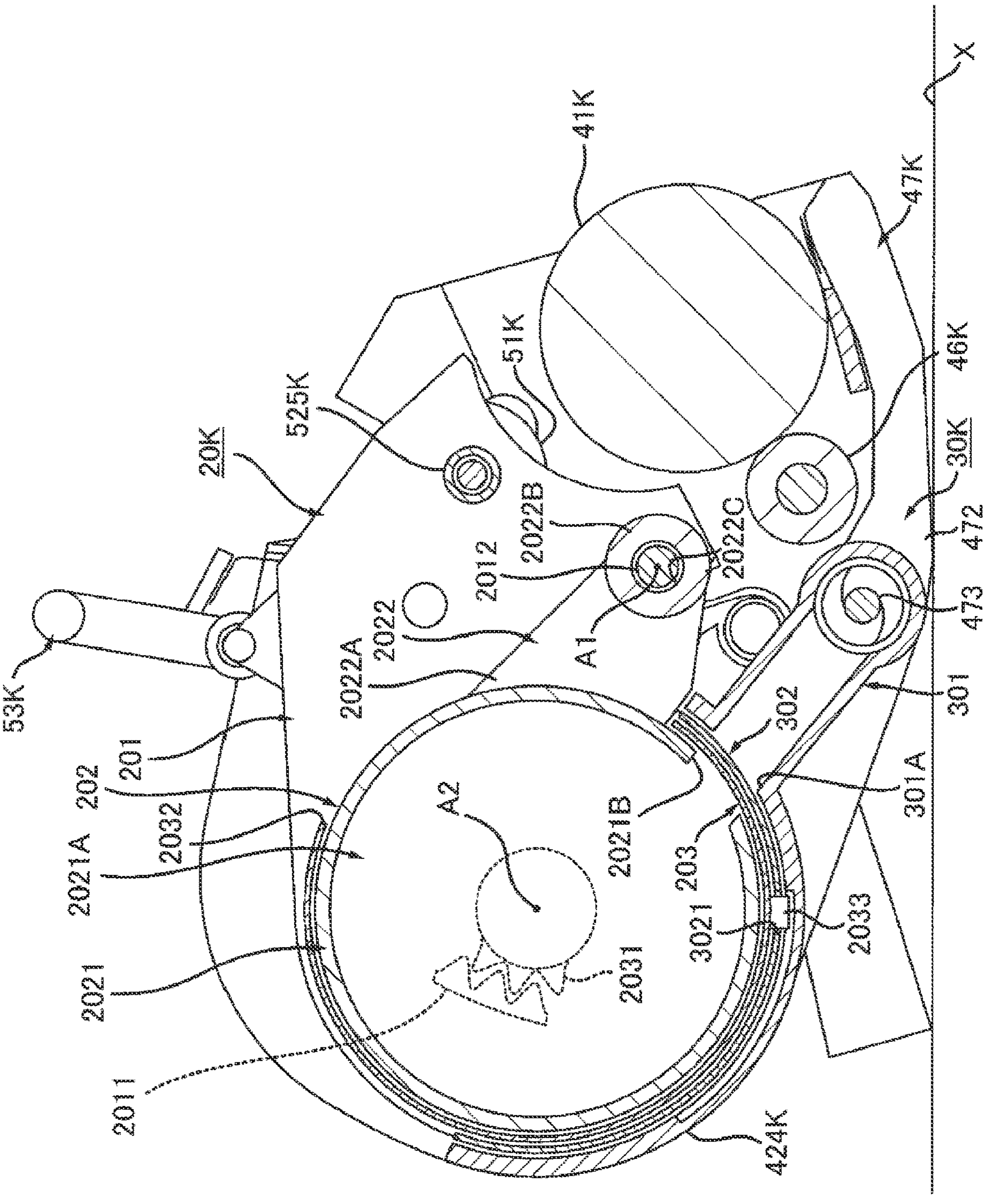
FIG. 9 is a sectional view taken along an A-A line in FIG. 12, showing a state where the developing cartridge shown in FIG. 8 is mounted to the drum cartridge and a developing housing is located in a spaced position.

The developing housing 201 can accommodate toner that is supplied to the photosensitive drum 41K (refer to FIG. 9).

Figure 10:
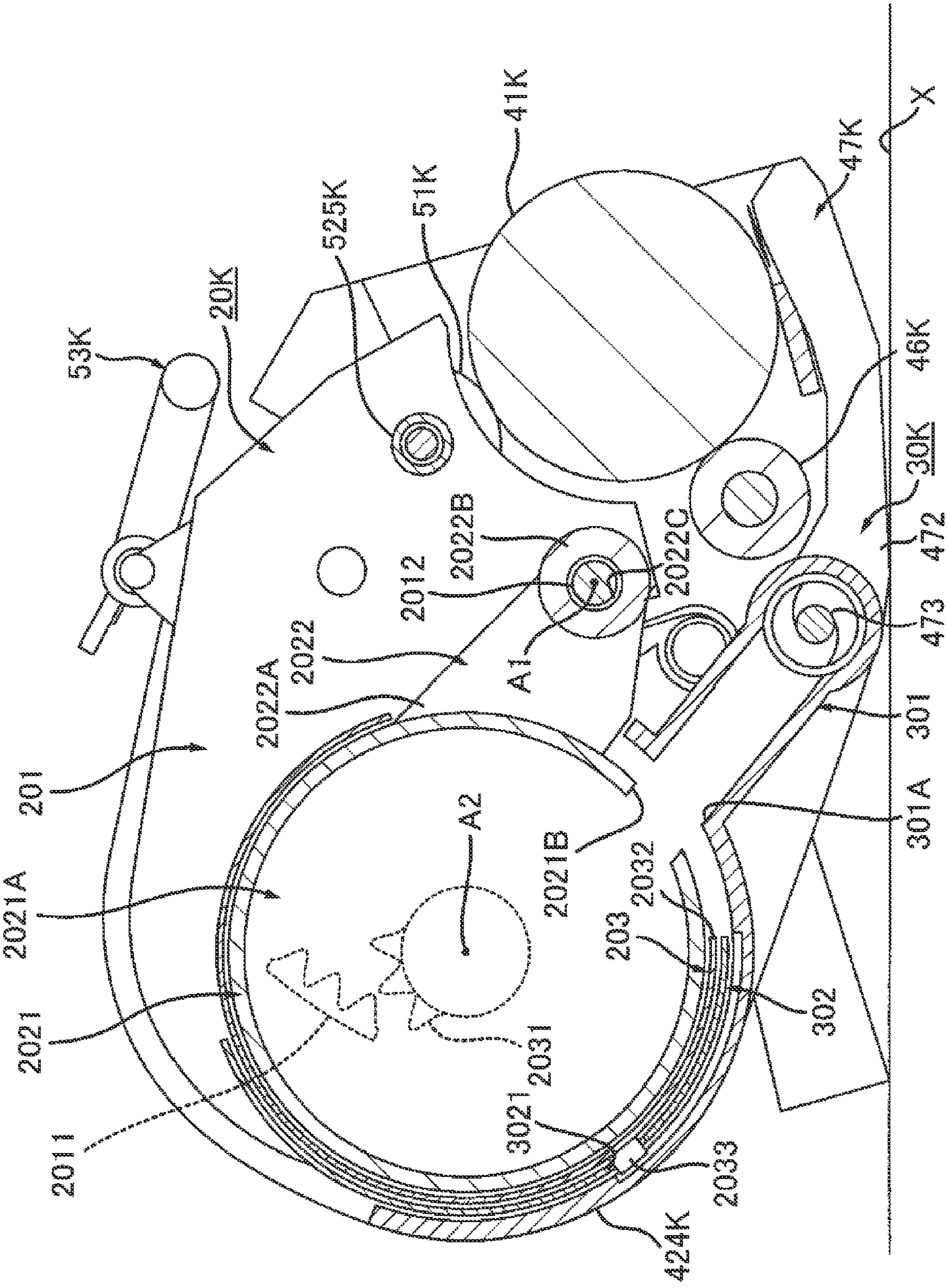
FIG. 10 shows a state where the developing housing shown in FIG. 9 is located in a contact position.

As shown in FIGS. 9 and 10, in a state where the developing cartridge 20K is mounted to a drum cartridge 30K, the developing housing 201 is movable between a contact position (refer to FIG. 10) and a spaced position (refer to FIG. 9) with respect to the drum cartridge 30K. The drum cartridge 30K will be described later. As shown in FIG. 10, in a state where the developing housing 201 is located in the contact position, the developing roller 51K is in contact with the photosensitive drum 41K. As shown in FIG. 9, in a state where the developing housing 201 is located in the spaced position, the developing roller 51K is away from the photosensitive drum 41K. Specifically, in the state where the developing cartridge 20K is mounted to the drum cartridge 30K, the developing housing 201 is rotatable about a first axis A1 between the contact position and the spaced position. The first axis A1 extends in the first direction.

As shown in FIG. 8, the developing housing 201 includes a first gear 2011 and a shaft 2012, in addition to the configuration of the developing housing 521K (refer to FIG. 5) of the first embodiment. The first gear 2011 is an example of the first protrusion.

The first gear 2011 is located on the second side surface S6 of the developing housing 201. The first gear 2011 is located between the second side surface S6 of the developing housing 201 and the first shutter 203 in the first direction. The first gear 2011 protrudes from the second side surface S6. The first gear 2011 may also be attached to the second side surface S6. The first gear 2011 extends along a circumference whose center is the first axis A1.

The shaft 2012 extends in the first direction along the first axis A1. The shaft 2012 extends from the second side surface S6 of the developing housing 201. The shaft 2012 may also be attached to the second side surface S6. The shaft 2012 has a circular column shape. In the state where the developing cartridge 20K is mounted to the drum cartridge 30K, the shaft 2012 is fitted to the first developing guide 4221K (refer to FIG. 11) of the drum cartridge 30K.

8.1.2 Waste Toner Housing 202

The waste toner housing 202 is located at the other end portion of the developing cartridge 20K in the first direction. The waste toner housing 202 is located on the other side of the developing housing 201 in the first direction. The waste toner housing 202 is aligned with the developing housing 201 in the first direction. In the state where the developing cartridge 20K is mounted to the drum cartridge 30K, the waste toner housing 202 is located between the developing housing 201 and the other end portion (refer to FIG. 12) of the drum cartridge 30K in the first direction. Specifically, in the state where the developing cartridge 20K is mounted to the drum cartridge 30K, the waste toner housing 202 is located between the developing housing 201 and the second side plate 422K (refer to FIG. 12) of the drum cartridge 30K in the first direction.

The waste toner housing 202 is movable with respect to the developing housing 201. The waste toner housing 202 is rotatable about the first axis A1 with respect to the developing housing 201. Specifically, the waste toner housing 202 includes a body 2021, and a connecting part 2022.

The body 2021 has a cylindrical shape. The body 2021 extends in the first direction. As shown in FIG. 9, the body 2021 includes a waste toner accommodation part 2021A, and a receiving port 2021B. In other words, the waste toner housing 202 includes the waste toner accommodation part 2021A, and the receiving port 2021B. The developing cartridge 20K also includes the waste toner accommodation part 2021A.

The waste toner accommodation part 2021A is located inside the body 2021. The waste toner accommodation part 2021A is an internal space of the body 2021. The waste toner accommodation part 2021A accommodates waste toner from the photosensitive drum 41K.

The receiving port 2021B can receive waste toner from a waste toner tube 301. The waste toner tube 301 will be described later. The receiving port 2021B communicates with the waste toner accommodation part 2021A. The waste toner received by the receiving port 2021B is accommodated in the waste toner accommodation part 2021A.

The connecting part 2022 connects the body 2021 and the shaft 2012 each other. The connecting part 2022 extends from the body 2021 toward the shaft 2012. The connecting part 2022 may also be attached to the body 2021. The connecting part 2022 is connected to the shaft 2012. Specifically, the connecting part 2022 has one end portion 2022A and the other end portion 2022B. The one end portion 2022A is connected to the body 2021. The other end portion 2022B is located away from the one end portion 2022A. The connecting part 2022 has a through-hole 2022C. The through-hole 2022C is located at the other end portion 2022B. The shaft 2012 is inserted in the through-hole 2022C.

8.1.3 First Shutter 203

As shown in FIGS. 9 and 10, the first shutter 203 is movable between a first closed position (refer to FIG. 9) and a first open position (refer to FIG. 10) with respect to the waste toner housing 202. As shown in FIG. 9, in a state where the first shutter 203 is located in the first closed position, the first shutter 203 closes the receiving port 2021B. As shown in FIG. 10, in a state where the first shutter 203 is located in the first open position, the receiving port 2021B is opened. The first shutter 203 is movable between the first closed position and the first open position along a circumferential surface of the body 2021. The first shutter 203 is rotatable about an axis A2 between the first closed position and the first open position.

As shown in FIG. 8, the first shutter 203 has a cylindrical shape. The first shutter 203 covers the circumferential surface of the body 2021. Note that, the shape of the first shutter 203 is not limited to the cylindrical shape as long as it can cover the circumferential surface of the body 2021. The first shutter 203 includes a second gear 2031, an opening 2032, and a protrusion 2033 (refer to FIG. 9). The second gear 2031 is an example of the second protrusion.

The second gear 2031 is located on one side surface of the first shutter 203 in the first direction. The second gear 2031 is located between one side surface of the first shutter 203 and the second side surface S6 of the developing housing 201.

As shown in FIGS. 9 and 10, in the state where the developing cartridge 20K is mounted to the drum cartridge 30K, when the developing housing 201 moves between the contact position and the spaced position, the second gear 2031 meshes with the first gear 2011. In other words, in the state where the developing cartridge 20K is mounted to the drum cartridge 30K, when the developing housing 201 moves between the contact position and the spaced position, the second gear 2031 contacts the first gear 2011.

Specifically, as shown in FIG. 9, in the state where the developing cartridge 20K is mounted to the drum cartridge 30K and the developing housing 201 is located in the spaced position, the second gear 2031 is in mesh with the first gear 2011.

When the developing housing 201 is rotated from the spaced position toward the contact position, the first gear 2011 is moved in a rotating direction of the developing housing 201 from the spaced position toward the contact position, together with the developing housing 201. Then, the second gear 2031 is rotated in the rotating direction of the developing housing 201 from the spaced position toward the contact position, together with the first gear 2011. Then, the first shutter 203 is rotated from the first closed position (refer to FIG. 9) to the first open position (refer to FIG. 10), together with the second gear 2031. Specifically, when the developing housing 201 is moved from the spaced position to the contact position, the first gear 2011 meshes with the second gear 2031 to move the first shutter 203 from the first closed position to the first open position. In other words, when the developing housing 201 is moved from the spaced position to the contact position, the first gear 2011 contacts the second gear 2031 to move the first shutter 203 from the first closed position to the first open position.

As shown in FIG. 10, in the state where the first shutter 203 is located in the first open position and the developing housing 201 is located in the contact position, the first gear 2011 is away from the second gear 2031. By the first gear 2011 being away from the second gear 2031, the developing housing 201 is rotatable with respect to the drum cartridge 30K, independently of the first shutter 203, in the state where the developing cartridge 20K is mounted to the drum cartridge 30K and the developing housing 201 is located in the contact position.

Note that, in the state where the developing cartridge 20K is mounted to the drum cartridge 30K, when the developing housing 201 is rotated from the contact position (refer to FIG. 10) toward the spaced position (refer to FIG. 9), the first gear 2011 is moved toward the second gear 2031, together with the developing housing 201, and meshes with the second gear 2031. When the developing housing 201 is further rotated toward the spaced position, the second gear 2031 is rotated in the rotating direction of the developing housing 201 from the contact position toward the spaced position, together with the first gear 2011. Then, the first shutter 203 is moved from the first open position (refer to FIG. 10) to the first closed position (refer to FIG. 9), together with the second gear 2031. Specifically, when the developing housing 201 is moved from the contact position to the spaced position, the first gear 2011 meshes with the second gear 2031 to move the first shutter 203 from the first open position to the first closed position. In other words, when the developing housing 201 is moved from the contact position to the spaced position, the first gear 2011 contacts the second gear 2031 to move the first shutter 203 from the first open position to the first closed position.

As shown in FIG. 8, the opening 2032 is located on the circumferential surface of the first shutter 203. The connecting part 2022 of the waste toner housing 202 passes through the opening 2032. As shown in FIG. 10, in the state where the developing cartridge 20K is mounted to the drum cartridge 30K and the first shutter 203 is located in the first open position, the opening 2032 communicates with the receiving port 2021B.

As shown in FIG. 9, the protrusion 2033 extends from the circumferential surface of the first shutter 203. In the state where the developing cartridge 20K is mounted to the drum cartridge 30K, the protrusion 2033 is fitted in a hole 3021 (refer to FIG. 12) of the second shutter 302. The second shutter 302 will be described later.

8.2 Drum Cartridge 30K

Figure 11:
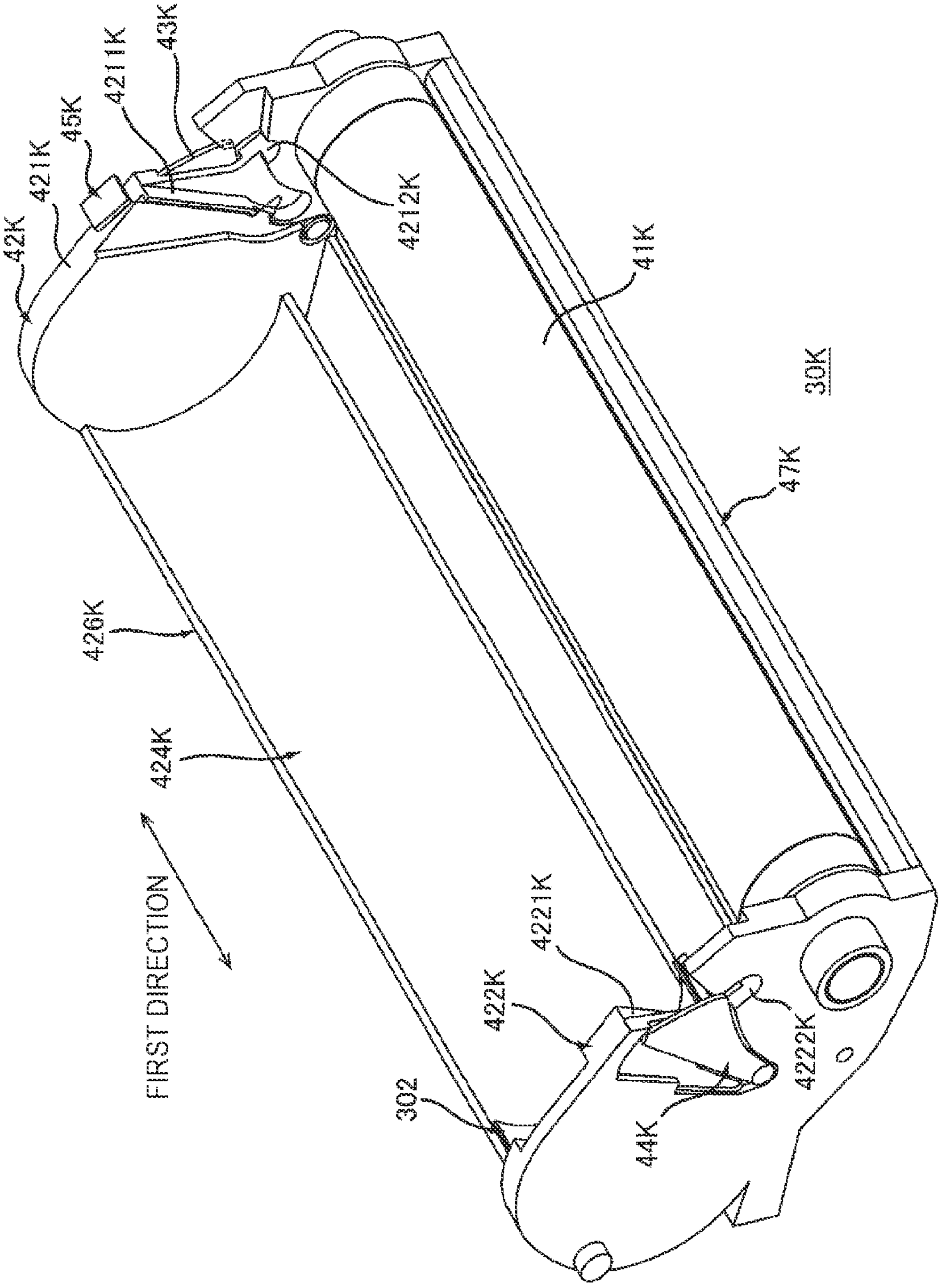
FIG. 11 is a perspective view of a drum cartridge of the second embodiment.

As shown in FIG. 11, the drum cartridge 30K includes a waste toner tube 301 (refer to FIG. 9) and a second shutter 302, in addition to the photosensitive drum 41K, the charging device 46K (refer to FIG. 9), the drum frame 42K, the first pressing member 43K, the second pressing member 44K, the lock 45K and the drum cleaner 47K.

8.2.1 Waste Toner Tube 301

Figure 12:
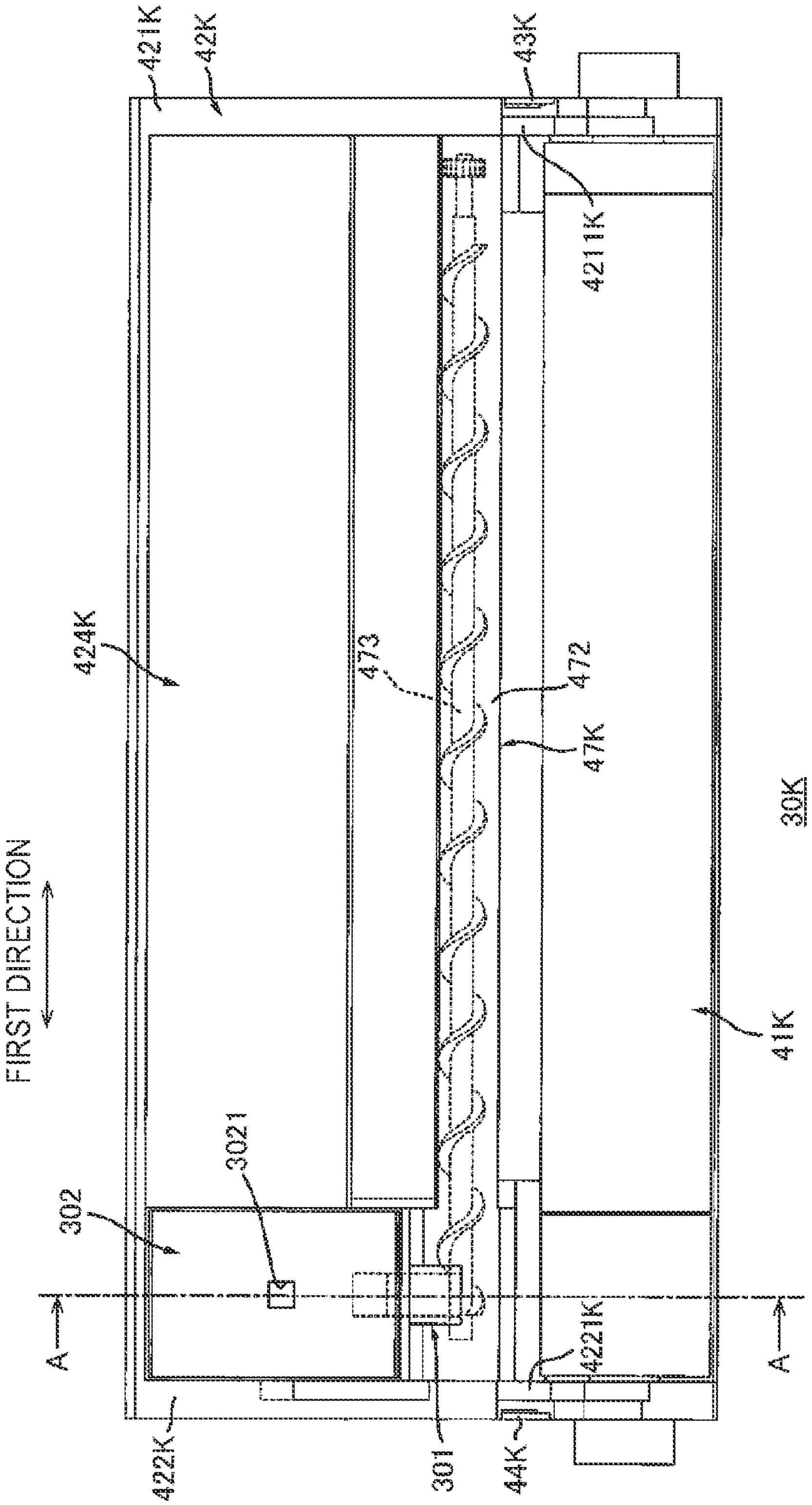
FIG. 12 is a plan view of the drum cartridge of the second embodiment.

As shown in FIG. 12, the waste toner tube 301 is located at the other end portion of the drum cleaner 47K in the first direction. In the state where the developing cartridge 20K (refer to FIG. 8) is mounted to the drum cartridge 30K, a part of the waste toner tube 301 is located between the developing housing 201 (refer to FIG. 8) and the other end portion of the drum cartridge 30K in the first direction. Specifically, in the state where the developing cartridge 20K (refer to FIG. 8) is mounted to the drum cartridge 30K, a part of the waste toner tube 301 is located between the developing housing 201 (refer to FIG. 8) and the second side plate 422K of the drum cartridge 30K in the first direction.

As shown in FIG. 9, the waste toner tube 301 allows the waste toner to pass from the drum cleaner 47K toward the waste toner housing 202. One end portion of the waste toner tube 301 is connected to the drum cleaner 47K. An internal space of the waste toner tube 301 communicates with an internal space of the cleaner housing 472 of the drum cleaner 47K. Note that, the drum cleaner 47K further has a screw 473. The screw 473 is located inside the cleaner housing 472. The screw 473 conveys the waste toner in the cleaner housing 472 toward the waste toner tube 301. The screw 473 extends in the first direction. An end portion of the screw 473 in the first direction is located in one end portion of the waste toner tube 301. The other end portion of the waste toner tube 301 is connected to the bottom plate 424K. The waste toner tube 301 has a discharge port 301A.

The discharge port 301A discharges the waste toner in the waste toner tube 301. The discharge port 301A is located at the other end portion of the waste toner tube 301. The discharge port 301A communicates with the internal space of the waste toner tube 301.

In a state where the drum cartridge 30K is placed on the placement surface X, the discharge port 301A is located above one end portion of the waste toner tube 301. In the state where the drum cartridge 30K is placed on the placement surface X, the discharge port 301A is located above the screw 473. Thereby, in the state where the drum cartridge 30K is placed on the placement surface X, the waste toner is prevented from overflowing from the discharge port 301A.

Note that, in the state where the drum cartridge 30K is mounted to the image forming apparatus 1, the discharge port 301A is located below one end portion of the waste toner tube 301. For this reason, in the state where the drum cartridge 30K is mounted to the image forming apparatus 1, the waste toner in the waste toner tube 301 can be discharged from the discharge port 301A by the gravity.

8.2.3 Second Shutter 302

As shown in FIG. 12, the second shutter 302 is located at the other end portion of the bottom plate 424K of the drum cartridge 30K in the first direction.

As shown in FIGS. 9 and 10, the second shutter 302 is movable between a second closed position (refer to FIG. 9) and a second open position (refer to FIG. 10) with respect to the waste toner tube 301. The second shutter 302 is also movable between the second closed position (refer to FIG. 9) and the second open position (refer to FIG. 10) with respect to the bottom plate 424K.

As shown in FIG. 9, in a state where the second shutter 302 is located in the second closed position, the second shutter 302 closes the discharge port 301A. As shown in FIG. 10, in a state where the second shutter 302 is located in the second open position, the discharge port 301A is opened.

In the state where the developing cartridge 20K is mounted to the drum cartridge 30K, the second shutter 302 is movable together with the first shutter 203. Specifically, as shown in FIG. 12, the second shutter 302 has a hole 3021.

As described above, in the state where the developing cartridge 20K is mounted to the drum cartridge 30K, the protrusion 2033 (refer to FIG. 9) of the first shutter 203 is fitted in the hole 3021 of the second shutter 302. Thereby, in the state where the developing cartridge 20K is mounted to the drum cartridge 30K, the second shutter 302 is movable together with the first shutter 203.

As shown in FIGS. 9 and 10, in the state where the developing cartridge 20K is mounted to the drum cartridge 30K, when the first shutter 203 is moved from the first closed position (refer to FIG. 9) to the first open position (refer to FIG. 10), the second shutter 302 is moved from the second closed position (refer to FIG. 9) to the second open position (refer to FIG. 10), together with the first shutter 203.

In the state where the developing cartridge 20K is mounted to the drum cartridge 30K, when the first shutter 203 is moved from the first open position (refer to FIG. 10) to the first closed position (refer to FIG. 9), the second shutter 302 is moved from the second open position (refer to FIG. 10) to the second closed position (refer to FIG. 9), together with the first shutter 203.

8.3 Operational Effects of Second Embodiment (1) According to the second embodiment, as shown in FIG. 8, the developing cartridge 20K includes the waste toner housing 202. The waste toner housing 202 includes the waste toner accommodation part 2021A (refer to FIG. 9).

For this reason, in a configuration where the developing cartridge 20K and the drum cartridge 30K (refer to FIG. 11) can be individually replaced, the waste toner can be treated when replacing the developing cartridge 20K.

(2) According to the second embodiment, as shown in FIGS. 9 and 10, the waste toner housing 202 is movable with respect to the developing housing 201.

For this reason, in the state where the developing cartridge 20K is mounted to the drum cartridge 30K, it is possible to move the developing housing 201 with respect to the drum cartridge 30K while fixing the waste toner housing 202 to the drum cartridge 30K.

(3) According to the second embodiment, as shown in FIGS. 9 and 10, in the state where the developing cartridge 20K is mounted to the drum cartridge 30K, the developing housing 201 is movable between the contact position (refer to FIG. 10) and the spaced position (refer to FIG. 9) with respect to the drum cartridge 30K.

For this reason, in the state where the developing cartridge 20K is mounted to the drum cartridge 30K, it is possible to move the developing housing 201 between the contact position and the spaced position with respect to the drum cartridge 30K while fixing the waste toner housing 202 to the drum cartridge 30K.

(4) According to the second embodiment, as shown in FIGS. 9 and 10, when the developing housing 201 is moved from the spaced position (refer to FIG. 9) to the contact position (refer to FIG. 10), the first gear 2011 is contacted to the second gear 2031, so that the first shutter 203 is moved from the first closed position (refer to FIG. 9) to the first open position (refer to FIG. 10).

In addition, when the developing housing 201 is moved from the contact position (refer to FIG. 10) to the spaced position (refer to FIG. 9), the first gear 2011 contacts the second gear 2031 to move the first shutter 203 from the first open position (refer to FIG. 10) to the first closed position (refer to FIG. 9).

Thereby, it is possible to move the first shutter 203, in conjunction with the moving of the developing housing 201.

For this reason, when mounting the developing cartridge 20K to the drum cartridge 30K, the operator can also move the first shutter 203 by the operation of moving the developing housing 201.

As a result, it is possible to mount the developing cartridge 20K to the drum cartridge 30K with few actions.

(5) According to the second embodiment, as shown in FIGS. 9 and 10, it is possible to interlock the developing housing 201 and the first shutter 203 by the simple configuration where the developing housing 201 is provided with the first gear 2011 and the first shutter 203 is provided with the second gear 2031.

(6) According to the second embodiment, as shown in FIGS. 9 and 10, in the state where the developing cartridge 20K is mounted to the drum cartridge 30K, the second shutter 302 may be moved together with the first shutter 203.

Thereby, it is possible to interlock the moving of the developing housing 201 and the moving of the second shutter 302 via the first shutter 203.

For this reason, when mounting the developing cartridge 20K to the drum cartridge 30K, the operator can move not only the first shutter 203 but also the second shutter 302 by the operation of moving the developing housing 201.

As a result, it is possible to mount the developing cartridge 20K to the drum cartridge 30K with few actions.

(7) In the second embodiment, the operational effects similar to the first embodiment can also be achieved.

9. Modified Embodiments

The transfer device 7 may include a conveying belt, instead of the intermediate transfer belt 71 and the secondary transfer roller 73. The conveying belt conveys the sheet S fed from the sheet cassette 3 toward the fixing device 8. The sheet S conveyed by the conveying belt passes between the transfer device 7 and the four photosensitive drums 41Y, 41M, 41C and 41K. At this time, the transfer device 7 transfers the toners on the four photosensitive drums 41Y, 41M, 41C and 41K onto the sheet S.

In this modified embodiment, the operational effects similar to the first and second embodiments can also be achieved.

What is claimed is:

1. An image forming apparatus comprising:

a housing having an opening;

a drawer movable, through the opening, between a housing position in which the drawer is housed in the housing and a drawn position in which the drawer is drawn from the housing;

a process cartridge mountable to and removable from the drawer, and including:

a drum cartridge including a photosensitive drum that rotates about a first axis extending in a first direction; and a developing cartridge including a developing roller that supplies toner to the photosensitive drum and rotates about a second axis extending in parallel with the first axis; and an intermediate transfer belt located above the drum cartridge in a state where the process cartridge is mounted to the drawer and the drawer is located in the housing position, wherein the developing cartridge includes a handle, the handle located opposite to the photosensitive drum with respect to the developing roller in a direction of drawing the drawer, in a state where the process cartridge is mounted to the drawer; and wherein the developing cartridge is mountable to and removable from the drum cartridge, wherein the drum cartridge includes a guide that guides the developing cartridge to be mounted to and removed from the drum cartridge, wherein the guide includes a receiving portion that receives the developing cartridge and an end portion at which the developing cartridge is mounted to the drum cartridge, wherein the receiving portion of the guide extends in a second direction, and wherein the end portion of the guide extends in a third direction that is different from the second direction.

2. The image forming apparatus according to claim 1, wherein the handle is provided to be rotatable with respect to the developing cartridge, and is movable between a first position in which the handle is disposed along the developing cartridge and a second position in which the handle rises from the developing cartridge.

3. The image forming apparatus according to claim 2, wherein the handle extends in the third direction in which the end portion of the guide for the developing cartridge extends, in a state where the handle is located in the second position.

4. The image forming apparatus according to claim 2, wherein the handle includes a grip, the grip located facing the intermediate transfer belt in a case where the process cartridge is mounted to the drawer and the drawer is located in the housing position.

5. The image forming apparatus according to claim 2, wherein the handle includes a grip, the grip located above the developing cartridge in a case where the process cartridge is mounted to the drawer and the drawer is located in the housing position.

6. The image forming apparatus according to claim 2, wherein the handle includes a grip, the grip located between the developing cartridge and the intermediate transfer belt in a case where the process cartridge is mounted to the drawer and the drawer is located in the housing position.

7. The image forming apparatus according to claim 2, wherein the handle extends in the second direction in which the receiving portion of the guide for the developing cartridge extends, in a state where the handle is located in the first position.

8. The image forming apparatus according to claim 1, wherein the handle is provided at a center of the developing cartridge in the first direction.

9. An image forming apparatus comprising:

a housing having an opening;

a drawer movable, through the opening, between a housing position in which the drawer is housed in the housing and a drawn position in which the drawer is drawn from the housing;

a process cartridge mountable to and removable from the drawer, and including:

a drum cartridge including a photosensitive drum that rotates about a first axis extending in a first direction; and a developing cartridge including a developing roller that supplies toner to the photosensitive drum and rotates about a second axis extending in parallel with the first axis; and an intermediate transfer belt located above the drum cartridge in a state where the process cartridge is mounted to the drawer and the drawer is located in the housing position, wherein the developing cartridge includes a handle, the handle located opposite to the photosensitive drum with respect to the developing roller in a direction of drawing the drawer, in a state where the process cartridge is mounted to the drawer;

wherein the drum cartridge includes a lock lever, the lock lever movable between a lock position and unlock position, and wherein at least a part of the lock lever located in the lock position overlaps the handle in a case of viewing the lock lever in the first direction.

10. The image forming apparatus according to claim 9, wherein the lock lever is provided at one end of the drum cartridge in the first direction.

11. The image forming apparatus according to claim 9, wherein the process cartridge is a first process cartridge, wherein the image forming apparatus further comprises a second process cartridge which has the same configuration with the first process cartridge, wherein the drawer retains the first process cartridge and the second process cartridge along the direction of drawing the drawer, and wherein each of the first process cartridge and the second process cartridge is mountable to and removable from the drawer.

12. The image forming apparatus according to claim 1, wherein:

the guide, including the receiving portion and the end portion, includes a bend or curve, and such bend or curve is provided by the receiving portion and the end portion.

* * * * *